(12) United States Patent
Kasahara

(10) Patent No.: US 10,187,565 B2
(45) Date of Patent: Jan. 22, 2019

(54) IMAGE CAPTURING APPARATUS, IMAGE CAPTURING SYSTEM, AND IMAGE CAPTURING METHOD

(71) Applicant: Ryosuke Kasahara, Kanagawa (JP)

(72) Inventor: Ryosuke Kasahara, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/915,862

(22) PCT Filed: Sep. 26, 2014

(86) PCT No.: PCT/JP2014/076480
§ 371 (c)(1),
(2) Date: Mar. 1, 2016

(87) PCT Pub. No.: WO2015/046625
PCT Pub. Date: Apr. 2, 2015

(65) Prior Publication Data
US 2016/0219216 A1   Jul. 28, 2016

(30) Foreign Application Priority Data

Sep. 27, 2013   (JP) ................................. 2013-202576

(51) Int. Cl.
*G06T 5/00* (2006.01)
*H04N 5/232* (2006.01)
*G06T 5/20* (2006.01)

(52) U.S. Cl.
CPC ......... *H04N 5/23229* (2013.01); *G06T 5/002* (2013.01); *G06T 5/006* (2013.01);
(Continued)

(58) Field of Classification Search
None
See application file for complete search history.

(56) References Cited

U.S. PATENT DOCUMENTS 8,494,256 B2    7/2013   Aisaka et al.
2001/0043786 A1* 11/2001   Takahashi ............ H04N 5/7755
                                                    386/228
(Continued)

FOREIGN PATENT DOCUMENTS

CN          1739118 A     2/2006
CN        103020903 A     4/2013
(Continued)

OTHER PUBLICATIONS

International Search Report dated Dec. 22, 2014 in PCT/JP2014/076480 filed Sep. 26, 2014.
(Continued)

*Primary Examiner* — Twyler L Haskins
*Assistant Examiner* — Wesley J Chiu
(74) *Attorney, Agent, or Firm* — Oblon, McClelland, Maier & Neustadt, L.L.P.

(57) ABSTRACT

An image capturing apparatus includes: an optical system that gives aberration to incident light; an image capturing unit that converts the light that has passed through the optical system into pixels, and captures an image; and an inverse transform unit that obtains a first inverse transform filter for restoring the aberration for each predetermined part of the captured image captured by the image capturing unit, and performs a first inverse transformation process on the captured image by the first inverse transform filter.

19 Claims, 11 Drawing Sheets

(52) U.S. Cl.
CPC ........... *G06T 5/20* (2013.01); *H04N 5/23293* (2013.01); *G06T 2207/10024* (2013.01)

(56) References Cited

U.S. PATENT DOCUMENTS

| | | | | |
|---|---|---|---|---|
| 2003/0184663 | A1* | 10/2003 | Nakano | H04N 1/4092 348/241 |
| 2006/0039619 | A1* | 2/2006 | Feng | G06T 9/005 382/239 |
| 2006/0204054 | A1* | 9/2006 | Steinberg | H04N 5/232 382/118 |
| 2007/0002158 | A1* | 1/2007 | Robinson | H04N 5/2251 348/335 |
| 2008/0193034 | A1 | 8/2008 | Wang | |
| 2009/0128669 | A1 | 5/2009 | Ng | |
| 2010/0182476 | A1* | 7/2010 | Feng | G02B 27/0025 348/311 |
| 2011/0043666 | A1 | 2/2011 | Mitsumoto | |
| 2011/0096207 | A1* | 4/2011 | Izumi | G03B 19/12 348/241 |
| 2012/0070096 | A1 | 3/2012 | Oyama | |
| 2012/0206630 | A1 | 8/2012 | Nguyen et al. | |
| 2012/0288193 | A1* | 11/2012 | Hatakeyama | G06T 5/003 382/167 |
| 2013/0010158 | A1* | 1/2013 | Watanabe | H04N 5/217 348/231.6 |
| 2013/0010160 | A1 | 1/2013 | Kawamura | |
| 2013/0170765 | A1* | 7/2013 | Santos | G06T 5/003 382/255 |
| 2014/0118562 | A1* | 5/2014 | Bivolarsky | H04N 21/234363 348/207.1 |
| 2014/0375847 | A1 | 12/2014 | Kasahara | |
| 2015/0248776 | A1* | 9/2015 | Kasahara | G06T 11/006 348/222.1 |

FOREIGN PATENT DOCUMENTS

| | | |
|---|---|---|
| JP | 62-198974 | 9/1987 |
| JP | 2009-260545 A | 11/2009 |
| JP | 2010-147926 | 7/2010 |
| JP | 2011-071930 | 4/2011 |
| JP | 2011-198016 | 10/2011 |
| JP | 2011-198061 A | 10/2011 |
| JP | 2012-054795 | 3/2012 |
| JP | 2015-005933 | 1/2015 |
| RU | 2 479 037 C2 | 4/2013 |

OTHER PUBLICATIONS

Office Action dated Dec. 9, 2016 in Korean Patent Application No. 10-2016-7007675 (with English language translation).
Russian Office Action dated Nov. 16, 2017 for Ru Application No. 2016115562/07(024458) with English translation, 12 pages.
Chinese Office Action dated Feb. 24, 2018 in Chinese Patent Application No. 201480052566.7 with English translation, 17 pages.

* cited by examiner

FIG.10
(a) POWER SPECTRUM S'(ω) OF AREA 102
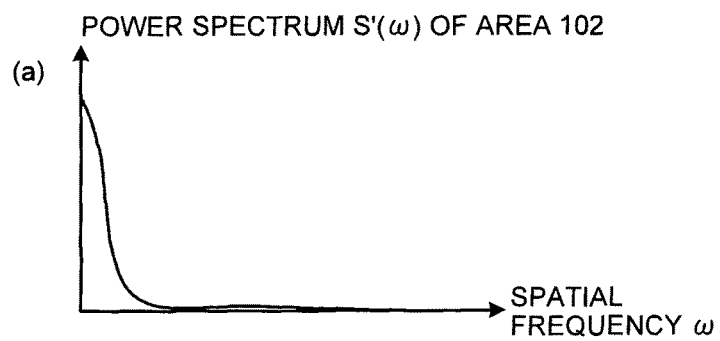
(b) OPTIMAL FILTER R'(ω) OF AREA 102
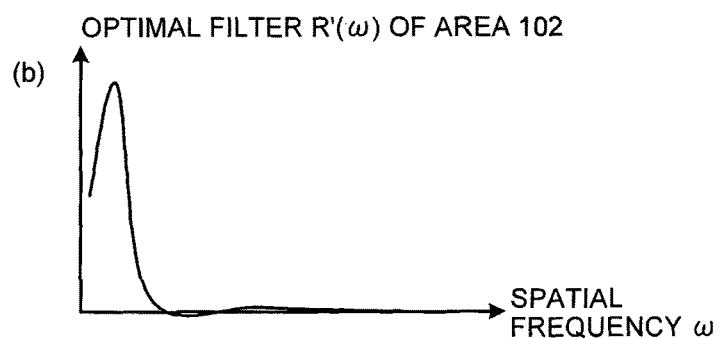
FIG.11
(a) POWER SPECTRUM S'(ω) OF AREA 103
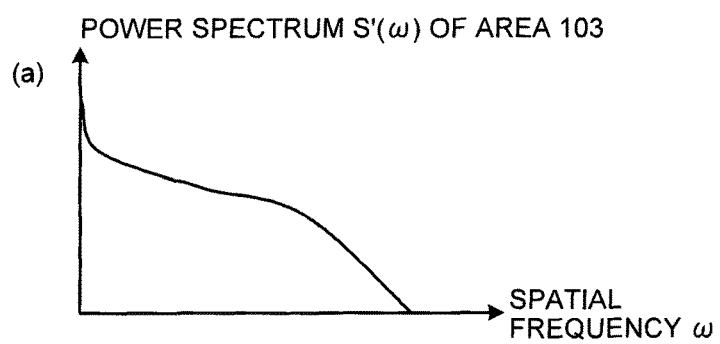
(b) OPTIMAL FILTER R'(ω) OF AREA 103
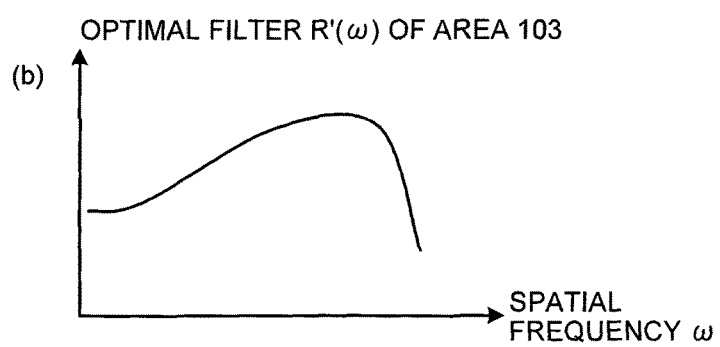

FIG.14

INVERSE TRANSFORM FILTER

| a11 | a12 | a13 | a14 | a15 |
|-----|-----|-----|-----|-----|
| a21 | a22 | a23 | a24 | a25 |
| a31 | a32 | a33 | a34 | a35 |
| a41 | a42 | a42 | a43 | a45 |
| a51 | a52 | a53 | a54 | a55 |

FIG.15

TARGET PARTIAL IMAGE
131

| A11 | A12 | A13 | A14 | A15 |
|---|---|---|---|---|
| A21 | A22 | A23 | A24 | A25 |
| A31 | A32 | A33 | A34 | A35 |
| A41 | A42 | A43 | A44 | A45 |
| A51 | A52 | A53 | A54 | A55 |

* (CONVOLU-TION)

INVERSE TRANSFORM FILTER
121

| a11 | a12 | a13 | a14 | a15 |
|---|---|---|---|---|
| a21 | a22 | a23 | a24 | a25 |
| a31 | a32 | a33 | a34 | a35 |
| a41 | a42 | a43 | a44 | a45 |
| a51 | a52 | a53 | a54 | a55 |

$$= \begin{array}{l} A11 \times a11 + A12 \times a12 + A13 \times a13 + A14 \times a14 + A15 \times a15 \\ + A21 \times a21 + A22 \times a22 + A23 \times a23 + A24 \times a24 + A25 \times a25 \\ + A31 \times a31 + A32 \times a32 + A33 \times a33 + A34 \times a34 + A35 \times a35 \\ + A41 \times a41 + A42 \times a42 + A43 \times a43 + A44 \times a44 + A45 \times a45 \\ + A51 \times a51 + A52 \times a52 + A53 \times a53 + A54 \times a54 + A55 \times a55 \end{array}$$

$\cdots$ EQUATION(27)

IMAGE CAPTURING APPARATUS, IMAGE CAPTURING SYSTEM, AND IMAGE CAPTURING METHOD

TECHNICAL FIELD

The present invention relates to an image capturing apparatus, an image capturing system, and an image capturing method.

BACKGROUND ART

In recent years, digitization has been developed significantly also in the field of image capturing apparatuses with the development of the digitization of information. Especially, in image capturing apparatuses represented by digital cameras, as for an image capturing surface, a traditional film is replaced by a solid state image capturing device. A CCD (Charge Coupled Device) sensor, CMOS (Complementary Metal Oxide Semiconductor) sensor, or the like is used as the solid state image capturing device (hereinafter simply referred to as an "image capturing device").

In this manner, the image capturing apparatus using the image capturing device takes in light from a subject through an optical system, extracts the light by converting it into electrical signals by the solid state image capturing device. Examples of such an image capturing apparatus include a video camera, a barcode reader, a mobile phone, a portable information terminal (PDA: Personal Digital Assistant), and an industrial camera, in addition to a digital camera.

The above-mentioned image capturing apparatus includes what is called an extended depth of field camera (EDoF: Extended Depth of Field) that extends the depth of field with the optical system. The depth of field indicates the range of distance in an optical axis direction of a lens in which it is acceptable to regard a subject at the distance away from the lens of the camera as being in focus.

A specific description is given of the extension of the depth of field by the optical system. A lens and a phase plate, which are included in the optical system, function to give aberration and add the point spread function (PSF: Point Spread Function) to the light of a subject incident on an image capturing device. For example, the lens gives spherical aberration, as the aberration, to the light of the subject incident on the image capturing device. The optical system causes an image captured by the image capturing device to be blurred by the aberration but makes the blur constant in a wide depth of field. Therefore, the image blurred by the optical system needs to be corrected in such a manner as to obtain a predetermined value of MTF (Modulation Transfer Function). MTF indicates a digitized value depicting the degree of fidelity to reproduce the contrast of the subject, in other words, the reproducibility of the contrast. In this case, the inverse transformation process of the point spread function is performed on the image blurred by the optical system to restore the image to a high resolution image. the inverse transformation process is implemented by correcting the blur of the image by performing a filtering process with an inverse transform filter on information of each pixel forming the image blurred by the optical system (hereinafter simply referred to as the pixel).

Moreover, an image captured by the image capturing device generally includes noise. Accordingly, a noise reduction process is also required. As an apparatus that reduces noise of such a captured image and corrects blur for restoration, proposed is an apparatus including a noise processing unit that generates a noise processed image by performing a noise process of reducing noise on an input image, and a restoration processing unit that performs a restoration process of reducing blur on the noise processed image (Patent Literature 1). The noise processing unit is configured to perform the noise process based on the characteristics of the restoration process.

However, the apparatus described in Patent Literature 1 has a problem in that the apparatus prevents deterioration of an image due to that the influence of the noise processing unit is amplified, and cannot fundamentally prevent amplification of noise. Moreover, resolution and the amount of noise are in the trade-off relationship. Therefore, there is also a problem that if the resolution of a lens is largely compensated, the amount of noise increases.

In view of the above, there is a need to provide an image capturing apparatus, image capturing system, and image capturing method that restore blur which is optical aberration while suppressing noise.

SUMMARY OF THE INVENTION

An image capturing apparatus includes: an optical system that gives aberration to incident light; an image capturing unit that converts the light that has passed through the optical system into pixels, and captures an image; and an inverse transform unit that obtains a first inverse transform filter for restoring the aberration for each predetermined part of the captured image captured by the image capturing unit, and performs a first inverse transformation process on the captured image by the first inverse transform filter.

BRIEF DESCRIPTION OF DRAWINGS

FIG. 10 is a diagram explaining a power spectrum and an optimal filter in an area of a flat portion of the detected image.

FIG. 11 is a diagram explaining a power spectrum and an optimal filter in an area of a texture portion of the detected image.

FIG. 14 is a diagram illustrating an example of the configuration of an inverse transform filter.

FIG. 15 is a diagram explaining performing a filtering process on an image by the inverse transform filter.

DESCRIPTION OF EMBODIMENTS

Hereinafter, a detailed description is given of embodiments of an image capturing apparatus, an image capturing system, and an image capturing method according to the present invention, with reference to the drawings. Moreover, the present invention is not limited by the following embodiments, and components in the following embodiments include one that can be easily conceived by those skilled in the art, is substantially the same one, and is what is within the range of equivalents as it is called. Furthermore, various omissions, replacements, and changes of the components can be made within a range in which they do not depart from the spirit of the following embodiments.

First Embodiment

<Entire Configuration of Image Capturing System>

Figure 1:
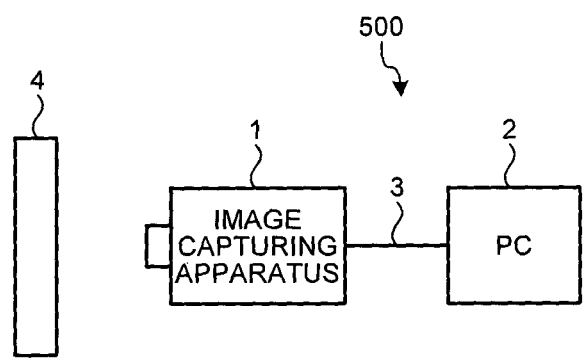
FIG. 1 is a diagram illustrating an example of the entire configuration of an image capturing system according to a first embodiment.

FIG. 1 is a diagram illustrating an example of the entire configuration of an image capturing system according to a first embodiment. The configuration of an image capturing system 500 of the embodiment is described with reference to FIG. 1.

As illustrated in FIG. 1, the image capturing system 500 of the embodiment includes an image capturing apparatus 1 and a PC 2. The image capturing apparatus 1 and the PC 2 are connected by a communication cable 3 such as an Ethernet (registered trademark) cable in such a manner as to be able to communicate with each other.

The image capturing apparatus 1 converts light emitted from the subject 4 into electrical signals to capture an image of a subject 4, executes various processes on information on the captured image (hereinafter simply referred to as the image), and transmits the processed image to the PC 2 via the communication cable 3. The PC 2 executes a predetermined process on the image received from the image capturing apparatus 1.

For example, the image capturing apparatus 1 captures an image of a barcode attached to a product carried in a production line and transmits the image of the barcode to the PC 2. The PC 2 reads out information on the barcode from the received image and analyzes the information.

As illustrated in FIG. 1, the image capturing system 500 is a system in a wired communication method in which the image capturing apparatus 1 and the PC 2 communicate data via the communication able 3, but is not limited to this. For example, the image capturing apparatus 1 and the PC 2 may be able to communicate data with each other in a wireless communication method such as Wi-Fi (registered trademark) (Wireless Fidelity).

Moreover, if the image capturing system 500 is used in the production line, the PC 2 may be configured to be connected to a PLC (Programmable Logic Controller) and/or the like in such a manner as to be able to communicate. In this case, examples of operations of the image capturing system 500 include the following operation. The image capturing apparatus 1 captures an image of a barcode attached to a product carried in the production line and transmits the image of the barcode to the PC 2. The PC 2 determines the product number of the product carried in the production line from the received image of the barcode. If the determined product number does not agree with a product number set in the production line, the PC 2 transmits, to the PLC, a signal indicating that the product for which the product number has been determined is a product having a different product number. When receiving, from the PC 2, the signal indicating that the product is a product having the different product number, the PLC removes the product from the production line, or controls the operation of the production line to turn on a warning lamp and stop the production line.

<Configuration of Information Processing Apparatus>

Figure 2:
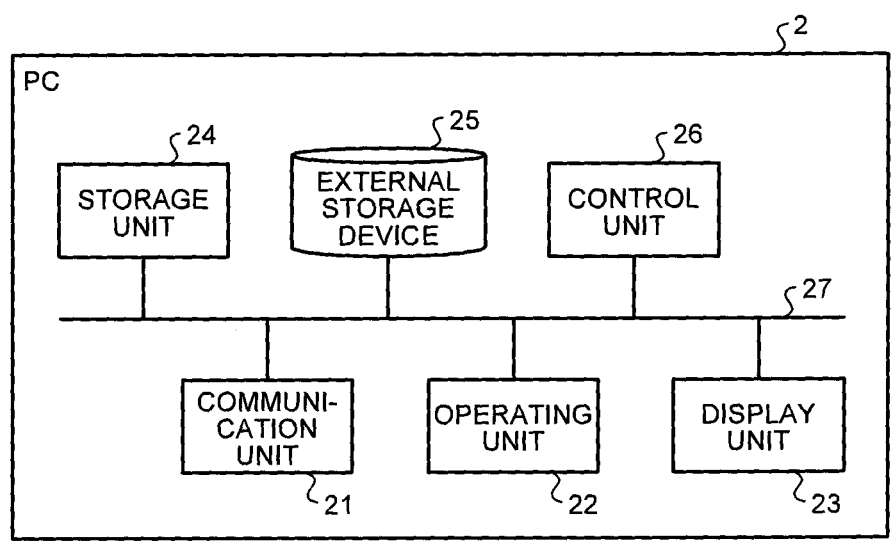
FIG. 2 is a diagram illustrating an example of the configuration of an information processing apparatus of the first embodiment.

FIG. 2 is a diagram illustrating an example of the configuration of an information processing apparatus of the first embodiment. The configuration of the PC 2 which is an example of the information processing apparatus is described with reference to FIG. 2.

As illustrated in FIG. 2, the PC 2 which is an example of the information processing apparatus includes a communication unit 21, an operating unit 22, a display unit 23, a storage unit 24, an external storage device 25, and a control unit 26. The above units are connected by a bus 27, and can transmit and receive data to and from each other.

The communication unit 21 is a device that communicates with the image capturing apparatus 1 via the communication cable 3. The communication unit 21 is realized by a communication device such as a NIC (Network Interface Card). A communication protocol of the communication unit 21 is realized by, for example, TCP (Transmission Control Protocol)/IP (Internet Protocol) or UDP (User Datagram Protocol)/IP.

The operating unit 22 is a device that allows a user to perform input operations to cause the control unit 26 to execute a predetermined process. The operating unit 22 is realized by an input operation function of, for example, a mouse, keyboard, numeric keypad, touchpad, or touchscreen.

The display unit 23 is a device that displays an application image which is executed by the control unit 26, and the like. The display unit 23 is realized by, for example, a CRT (Cathode Ray Tube) display, a liquid crystal display, a plasma display, or an organic EL (Electroluminescence) display.

The storage unit 24 is a device in which various programs executed in the PC 2, data used for various processes performed in the PC, and the like are stored. The storage unit 24 is realized by storage devices such as a ROM (Read Only Memory) and a RAM (Random Access Memory).

The external storage device 25 is a storage device in which an image, a program, font data, and the like are accumulated and stored. The external storage device 25 is realized by a storage device such as an HDD (Hard Disk Drive), SSD (Solid State Drive), optical disc, or magneto-optical disk (MO: Magneto-Optical Disk).

The control unit 26 is a device that controls the operation of each unit of the PC 2. The control unit 26 is realized by, for example, a CPU (Central Processing Unit) and an ASIC (Application Specific Integrated Circuit).

<Configuration of Image Capturing Apparatus>

Figure 3:
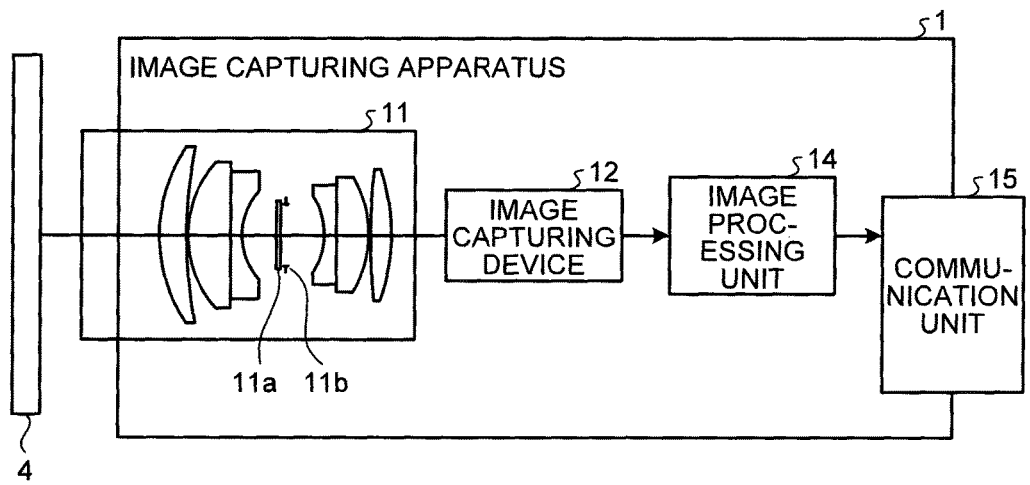
FIG. 3 is a diagram illustrating an example of the configuration of an image capturing apparatus according to the first embodiment.

FIG. 3 is a diagram illustrating an example of the configuration of the image capturing apparatus according to the first embodiment. The configuration of the image capturing apparatus 1 of the embodiment is described with reference to FIG. 3.

As illustrated in FIG. 3, the image capturing apparatus 1 includes a lens unit 11, an image capturing device 12, an image processing unit 14, and a communication unit 15.

The lens unit 11 is a unit that concentrates light emitted from the subject 4 and focuses an image on the image capturing device 12. The lens unit 11 is realized by an optical system including one or more lenses. The lens unit 11 includes a phase plate 11a and a diaphragm 11b. The subject 4 is, for example, a person, an object to be monitored, a barcode, a two-dimensional code, or a character string.

The phase plate 11a has a function to give aberration to light incident on the lens unit 11. As a consequence, the phase plate 11a gives the effect of adding the point spread function to light incident on the image capturing device 12, and causes an image captured by the image capturing device 12 to be blurred but makes the blur constant in a wide depth of field.

The diaphragm 11b is a member that automatically adjusts the amount of light incident on the lens unit 11, and is placed in the vicinity of the phase plate 11a.

The image capturing device 12 is a solid state image capturing device that converts light from the subject incident on the lens unit 11 into electrical signals to capture an image of the subject 4, and generates the image. The image capturing device 12 outputs pixels constituting an image captured by detection units constituting the solid state image capturing device. The image capturing device 12 is realized by, for example, a CCD sensor, or CMOS sensor.

The image processing unit 14 is a device that generates an image on which the filtering process has been performed, from the image output from the image capturing device 12.

The communication unit 15 is a device that communicates with the PC 2 via the communication cable 3. The communication unit 15 transmits, for example, the image output from the image processing unit 14 to the PC 2. The communication unit 15 is realized by, for example, a communication device such as an NIC. A communication protocol of the communication unit 15 is realized by, for example, TCP/IP or UDP/IP.

<Configuration of Image Processing Unit>

Figure 4:
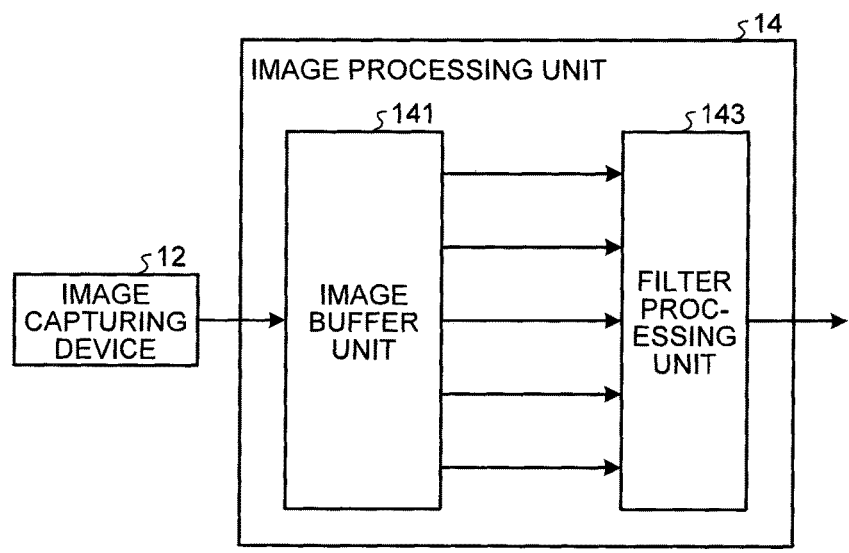
FIG. 4 is a diagram illustrating an example of the configuration of an image processing unit of the image capturing apparatus according to the first embodiment.
Figure 5:
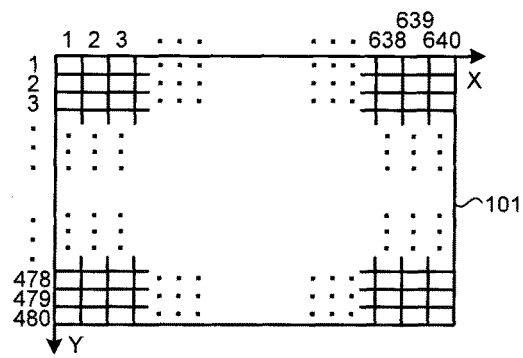
FIG. 5 is a diagram illustrating an example of an image detected by an image capturing device.

FIG. 4 is a diagram illustrating an example of the configuration of the image processing unit of the image capturing apparatus according to the first embodiment. FIG. 5 is a diagram illustrating an example of an image detected by the image capturing device. The configuration of the image processing unit 14 of the image capturing apparatus 1 of the embodiment is described with reference to FIG. 4.

As described above, the image capturing device 12 is a solid state image capturing device that converts light from the subject incident on the lens unit 11 into electrical signals to capture an image of the subject 4, and generates the image. Hereinafter, a description is given assuming that the image capturing device 12 forms and outputs a VGA image. Specifically, a description is given assuming that the image capturing device 12 detects a detected image 101 which is an image made up of pixels arranged in a matrix of 640×480, with 640 detecting elements in an X direction and 480 detecting elements in a Y direction, as illustrated in FIG. 5.

The size of an image detected by the image capturing device 12 is set to be a VGA image of 640×480, but is not limited to this. Needless to say, the size of an image may be different.

As illustrated in FIG. 4, the image processing unit 14 of the embodiment includes an image buffer unit 141 and a filter processing unit 143.

The image buffer unit 141 is a device into which pixels output from the image capturing device 12 are input in turn and that buffers them. The specific configuration and operation of the image buffer unit 141 are described below in FIGS. 6 and 7.

The filter processing unit 143 performs a predetermined filtering process on the pixels output from the image buffer unit 141 with a filter circuit described below. In the embodiment, a description is given taking, as an example of a filter used for the filtering process, an inverse transform filter for performing an inverse transformation process of correcting blur locally (on a pixel basis), on a blurred image to which the point spread function has been given by the effect of the phase plate 11a. The specific configuration and operation of the filter processing unit 143 are described below in FIG. 12.

<Configuration and Operation of Image Buffer Unit>

Figure 6:
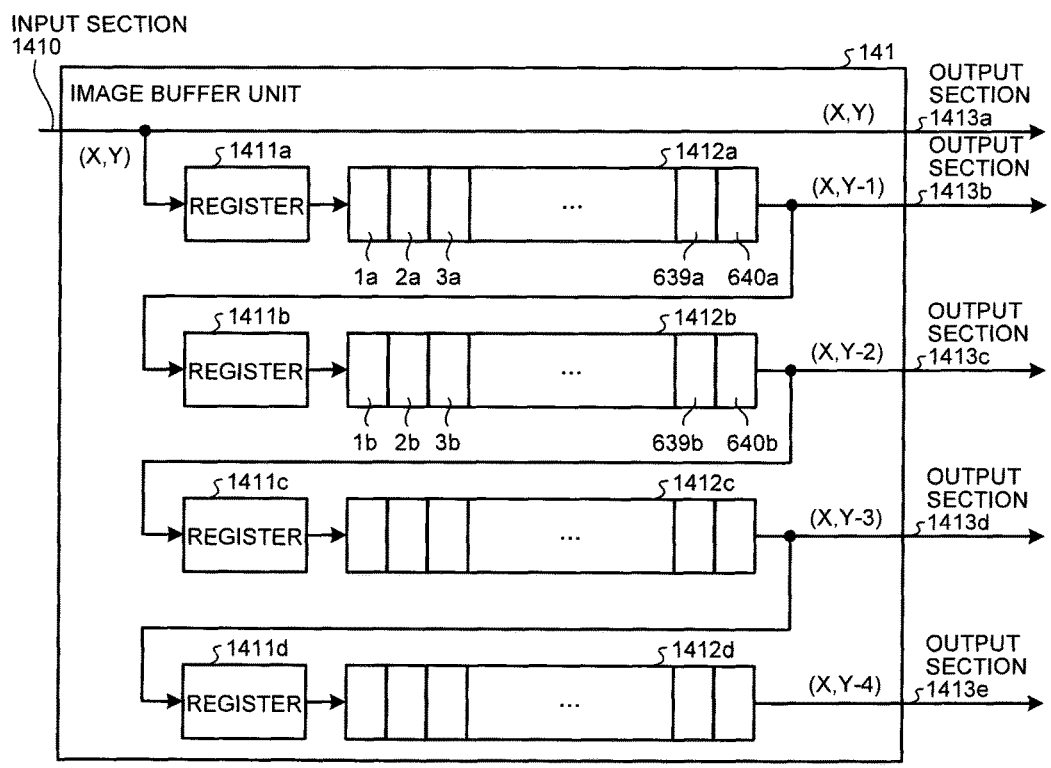
FIG. 6 is a diagram illustrating an example of the configuration of an image buffer unit of the image processing unit.
Figure 7:
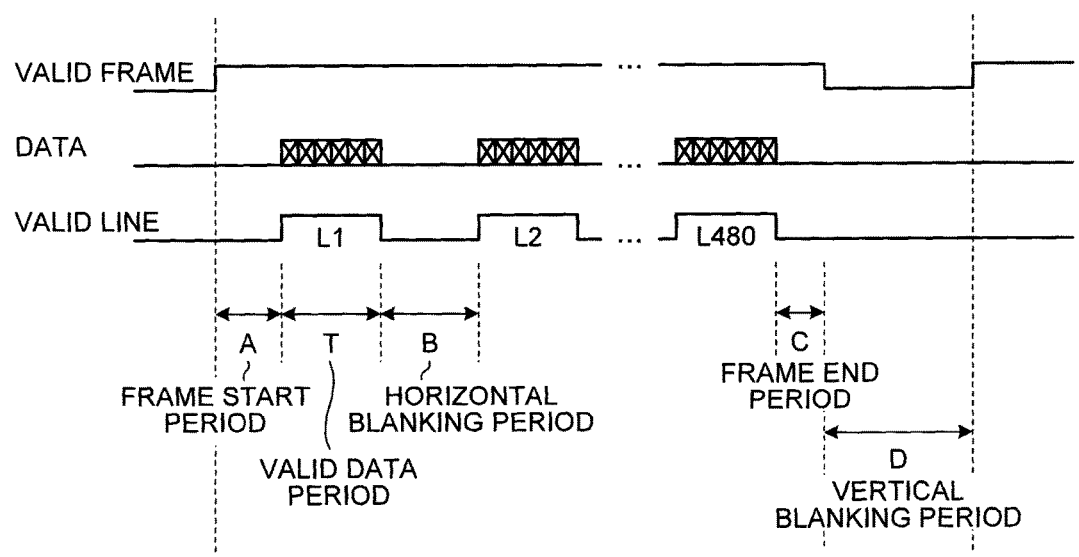
FIG. 7 is a timing chart illustrating the operation of inputting pixels output from the image capturing device into the image buffer unit.

FIG. 6 is a diagram illustrating an example of the configuration of the image buffer unit of the image processing unit. FIG. 7 is a timing chart illustrating the operation of inputting pixels output from the image capturing device into the image buffer unit. The configuration and operation of the image buffer unit 141 of the image processing unit 14 are described with reference to FIGS. 6 and 7.

As illustrated in FIG. 6, the image buffer unit 141 includes registers 1411a to 1411d, and line buffers 1412a to 1412d. Pixels output from the image capturing device 12 are input into the image buffer unit 141 from an input section 1410, and the image buffer unit 141 outputs the buffered pixels from output sections 1413a to 1413e. In terms of the 640×480 pixels of the image detected by the image capturing device 12, a pixel in the X-th in the X direction and in the Y-th in the Y direction is assumed to be a pixel (X, Y).

As illustrated in FIG. 6, the input side of the register 1411a is connected to the input section 1410 and the output section 1413a. The output sides of the registers 1411a to 1411d are connected to the input sides of the line buffers 1412a to 1412d, respectively. The output sides of the line buffers 1412a to 1412c are connected to the input sides of the registers 1411b to 1411d, respectively. The output sides of the line buffers 1412a to 1412d are connected to the output sections 1413b to 1413e, respectively.

Next, the output operation of an image detected by the image capturing device 12 is described with reference to FIG. 7. The image capturing device 12 outputs pixels included in each horizontal line while scanning the detected pixels in units of one horizontal line in the X direction. Specifically, the image capturing device 12 outputs the pixels included in the first horizontal line in the Y direction in turn from the first pixel to the 640th pixel in the X direction. The image capturing device 12 performs the above operation to output pixels included in horizontal lines up to the 480th horizontal line in the Y direction.

The above operation is described based on the timing chart illustrated in FIG. 7. As illustrated in FIG. 7, the image capturing device 12 outputs pixels of one frame, that is, of one image when a valid frame signal is on. In the image capturing device 12, a valid line signal L1 indicating permission to output the pixels in the first horizontal line in the Y direction is turned on after the passage of a frame start period A since the valid frame signal has been turned on. The image capturing device 12 scans the first horizontal line in the Y direction during a valid data period T when the valid line signal L1 is on and, in turn, outputs the first to 640th pixels in the X direction included in the first horizontal line (pixels (1, 1) to (640, 1)). After the pixels in the first horizontal line in the Y direction are output by the image capturing device 12, the valid line signal L1 is turned off.

In the image capturing device 12, a valid line signal L2 indicating permission to output the pixels in the second horizontal line in the Y direction is turned on after the passage of a horizontal blanking period B since the valid line signal L1 has been turned off. The image capturing device 12 scans the second horizontal line in the Y direction during the valid data period T when the valid line signal L2 is on and, in turn, outputs the first to 640th pixels in the X direction included in the second horizontal line (pixels (1, 2) to (640, 2)). After the pixels in the second horizontal line in the Y direction are output by the image capturing device 12, the valid line signal L2 is turned off.

The image capturing device 12 performs the above operation until outputting the first to 640th pixels in the X direction included in the 480th horizontal line in the Y direction (pixels (1, 480) to (640, 480)) during the valid data period T when a valid line signal L480 is on. In the image capturing device 12, the valid frame signal is turned off after the passage of a frame end period C since the valid line signal L480 has been turned off. With the above operations, the output of pixels of one frame by the image capturing device 12 ends. Moreover, in the image capturing device 12, after the passage of a vertical blanking period D since the valid frame signal has been turned off, the valid frame signal is turned on again, and output of pixels of the next frame starts.

Next, a description is given of a buffering process of pixels output from the image capturing device 12 in the image buffer unit 141, with reference to FIG. 6. Pixels output from the image capturing device 12 are input into the image buffer unit 141 from the input section 1410. Specifically, in terms of the first horizontal line in the X direction, firstly, the image buffer unit 141 outputs, from the output section 1413a, the pixel (1, 1) input from the image capturing device 12, and stores the pixel (1, 1) in the register 1411a.

The image buffer unit 141 stores the pixel stored in the register 1411a in a storage area 1a of the line buffer 1412a at the next timing. The image buffer unit 141 then outputs, from the output section 1413a, the pixel (2, 1) input next from the image capturing device 12, and stores the pixel (2, 1) in the register 1411a.

At the next timing, the image buffer unit 141 shifts the pixel stored in the storage area 1a to a storage area 2a of the line buffer 1412a to store it there, and stores the pixel stored in the register 1411a in the storage area 1a. The image buffer unit 141 then outputs, from the output section 1413a, the pixel (3, 1) input next from the image capturing device 12, and stores the pixel (3, 1) in the register 1411a.

The image buffer unit 141 repeats the above operations to output, from the output section 1413a, the pixels of the first horizontal line in the Y direction input from the image capturing device 12. At the same time, the image buffer unit 141 stores the first to 639th pixels of the first horizontal line in the Y direction in storage areas 639a to 1a of the line buffer 1412a, respectively, and the 640th pixel in the register 1411a.

Next, the image buffer unit 141 shifts the pixels stored in the storage areas 1a to 639a of the line buffer 1412a to the storage areas 2a to 640a to store them there, and stores the pixel stored in the register 1411a in the storage area 1a. The image buffer unit 141 outputs the pixel (1, 1) stored in the storage area 640a from the output section 1413b and stores the pixel (1, 1) in the register 1411b. In terms of the second horizontal line in the Y direction, the image buffer unit 141 outputs, from the output section 1413a, the pixel (1, 2) input from the image capturing device 12, and stores the pixel (1, 2) in the register 1411a. In other words, the image buffer unit 141 outputs the pixels (1, 1) and (1, 2) which are pixels having the same X-direction value from the output sections 1413b and 1413a, respectively.

The image buffer unit 141 stores the pixel stored in the register 1411b in a storage area 1b of the line buffer 1412b at the next timing. The image buffer unit 141 shifts the pixels stored in the storage areas 1a to 639a of the line buffer 1412a to the storage areas 2a to 640a to store them there, and stores the pixel stored in the register 1411a in the storage area 1a. The image buffer unit 141 outputs the pixel (2, 1) stored in the storage area 640a from the output section 1413b and stores the pixel (2, 1) in the register 1411b. The image buffer unit 141 then outputs, from the output section 1413a, the pixel (2, 2) input next from the image capturing device 12, and stores the pixel (2, 2) in the register 1411a.

At the next timing, the image buffer unit 141 shifts the pixel stored in the storage area 1b to a storage area 2b of the line buffer 1412b to store it there, and stores the pixel stored in the register 1411b in the storage area 1b. The image buffer unit 141 shifts the pixels stored in the storage areas 1a to 639a of the line buffer 1412a to the storage areas 2a to 640a to store them there, and stores the pixel stored in the register 1411a in the storage area 1a. The image buffer unit 141 outputs the pixel (3, 1) stored in the storage area 640a from the output section 1413b, and stores the pixel (3, 1) in the register 1411b. The image buffer unit 141 then outputs, from the output section 1413a, the pixel (3, 2) input next from the image capturing device 12, and stores the pixel (3, 2) in the register 1411a.

The image buffer unit 141 repeats the above operations to output pixels having the same X-direction value among the pixels in the first and second horizontal lines in the Y direction input from the image capturing device 12, from the output sections 1413a and 1413b at the same timing. At the same time, the image buffer unit 141 stores the first to 639th pixels in the first horizontal line in the Y direction in storage areas 639b to 1b of the line buffer 1412b, respectively, and the 640th pixels in the register 1411b. Furthermore, the image buffer unit 141 stores the first to 639th pixels in the second horizontal line in the Y direction in the storage areas 639a to 1a of the line buffer 1412a, respectively, and the 640th pixel in the register 1411a.

As in the above operations, the image buffer unit 141 buffers pixels in each horizontal line input from the image capturing device 12 in the line buffers 1412a to 1412d. At the same time, the image buffer unit 141 outputs pixels having the same X-direction value, in other words, pixels (X, Y−4), (X, Y−3), (X, Y−2), (X, Y−1), and (X, Y) from the output sections 1413a to 1413e, respectively, at the same timing.

FIG. 6 illustrates an example of the configuration of the image buffer unit 141. The image buffer unit 141 is not limited to this configuration, but is simply required to have a configuration that achieves a similar effect to the above-mentioned buffering process of the image buffer unit 141.

<Derivation of Frequency characteristic R of Inverse Transform Filter>

Next, a description is given of a method for deriving the frequency characteristic of an inverse transform filter used for the inverse transformation process for restoration in such a manner as to collect, to one point, a spot spread by the lens unit 11 which is an optical system at a predetermined focus position. A two-dimensional linear filter that is also a FIR (finite Impulse Response) filter is suitable for achieving the above-mentioned frequency characteristic.

Firstly, a model of the influence of the optical system on an image captured by the image capturing device 12 is expressed by an equation of a two-dimensional convolution operation (convolution operation) depicted in the following equation (1).

$$\text{image}_{captured}(x,y) = \iint \text{image}_{ideal}(x-x', y-y') \cdot h(x,y,x',y') \, dx'dy' \quad (1)$$

Here, $\text{image}_{captured}$ is a pixel of a two-dimensional captured image detected through the optical system, $\text{image}_{ideal}$ is a pixel of an ideal image representing the subject 4 itself, and h indicates the PSF of the optical system.

Hereinafter, give, a thought to the derivation of the frequency characteristic of the inverse transform filter minimizing the mean square error of the errors between each pixel of an image after the inverse transformation process and each pixel of the ideal image, considering the influence of noise added to the image processing system (the image capturing device 12 and the image processing unit 14). The mean square error is expressed by the following equation (2).

$$E[|\text{image}_{ideal}(n) - \text{image}_{processed}(n)|^2] \quad (2)$$

Here, E[ ] indicates the expected value (mean value), n indicates the location on the image, and $\text{image}_{processed}(n)$ indicates a pixel of the image obtained by performing the inverse transformation process on $\text{image}_{captured}$. It should be considered that $\text{image}_{captured}$ contains noise.

From the Parseval's theorem where the sum total of all the energy held by a waveform x(n) with respect to the entire region of n is equal to the sum total of a Fourier transform X(ω) of the energy of the waveform x(n) with respect to all the frequency components, equation (2) is expressed by the following equation (3) as the mean square error in the frequency domain.

$$E[|\text{IMAGE}_{ideal}(\omega) - \text{IMAGE}_{processed}(\omega)|^2] \quad (3)$$

Here, $\text{IMAGE}_{ideal}(\omega)$ indicates the frequency characteristic of $\text{image}_{ideal}(n)$, $\text{IMAGE}_{processed}(\omega)$ indicates the frequency characteristic of $\text{image}_{processed}(n)$, and ω indicates the spatial frequency.

Given that the frequency characteristic of the inverse transform filter is R(ω), the frequency characteristic R(ω) giving a minimum value of the following equation (4) is found to be an optimal inverse transform filter.

$$E[|\text{IMAGE}_{ideal}(\omega) - R(\omega) \cdot \text{IMAGE}_{captured}(\omega)|^2] \quad (4)$$

Here, $\text{IMAGE}_{captured}(\omega)$ is the frequency characteristic of $\text{image}_{captured}(n)$.

In equation (4), when expressing that $\text{IMAGE}_{ideal}(\omega) = S(\omega)$ and $\text{IMAGE}_{captured}(\omega) = X(\omega)$, and differentiating equation (4) by R* to obtain the minimum value of equation (4), the following equation (5) can be obtained.

$$\frac{\partial E[|S(\omega) - R(\omega) \cdot X(\omega)|^2]}{\partial R^*} = \quad (5)$$

$$\frac{\partial E[(S(\omega) - R(\omega)X(\omega))(S(\omega) - R(\omega)X(\omega))^*]}{\partial R^*} =$$

$$\frac{\partial E\left[\begin{array}{c} S(\omega)S(\omega)^* - S(\omega)(R(\omega)X(\omega))^* - \\ R(\omega)X(\omega)S(\omega)^* - R(\omega)X(\omega)(R(\omega)X(\omega))^* \end{array}\right]}{\partial R^*} =$$

$$\frac{\partial E\left[\begin{array}{c} |S(\omega)|^2 - S(\omega)R(\omega)^*X(\omega)^* - \\ R(\omega)X(\omega)S(\omega)^* + R(\omega)|X(\omega)|^2 R(\omega)^* \end{array}\right]}{\partial R^*} =$$

$$\frac{\partial \left\{\begin{array}{c} E[|S(\omega)|^2] - R(\omega)^*E[S(\omega)X(\omega)^*] - \\ R(\omega)E[X(\omega)S(\omega)^*] + R(\omega)R(\omega)^*|X(\omega)|^2 \end{array}\right\}}{\partial R^*} =$$

$$R(\omega) \cdot E[|X(\omega)|^2] - E[S(\omega) \cdot X(\omega)^*]$$

Here, $E[|X(\omega)|^2]$ is the power spectrum of a captured image including noise, and $E[S(\omega) \cdot X(\omega)^*]$ is the cross power spectrum of the captured image including noise and the ideal image.

Given that the rightmost side of equation (5) is 0 to obtain the minimum value of equation (4), the following equation (6) can be obtained.

$$R(\omega) \cdot E[|X(\omega)|^2] - E[S(\omega) \cdot X(\omega)^*] = 0 \quad (6)$$

The following equation (7) can be obtained from equation (6).

$$R(\omega) = \frac{E[S(\omega) \cdot X(\omega)^*]}{E[|X(\omega)|^2]} \quad (7)$$

The inverse transform filter based on the frequency characteristic R(ω) depicted in equation (7) is an optimal filter that minimizes the mean square error depicted in the above-mentioned equation (2).

Here, when supposing that the frequency characteristic of noise is W(ω) and the frequency characteristic of h is the PSF of the optical system is H(ω), and depicting the above-mentioned equation (1) in the frequency space, it is depicted by the following equation (8).

$$X(\omega) = H(\omega)S(\omega) + W(\omega) \quad (8)$$

Given that the frequency characteristic W(ω) of noise and a frequency characteristic S(ω) are uncorrelated, then, $E[S(\omega) \cdot W(\omega)^*] = 0$. Therefore, if equation (8) is substituted into the numerator on the right side of the above-mentioned equation (7), the following equation (9) can be obtained.

$$E[S(\omega) \cdot X(\omega)^*] = E[S(\omega)(H(\omega)S(\omega) + W(\omega))^*] \quad (9)$$

$$= E[S(\omega)((H(\omega)S(\omega))^* + W(\omega)^*)]$$

$$= E[S(\omega)(S(\omega)^*H(\omega)^* + W(\omega)^*)]$$

$$= E[|S(\omega)|^2 H(\omega)^*] + E[S(\omega)W(\omega)^*]$$

$$= E[|S(\omega)|^2 H(\omega)^*]$$

$$= H(\omega)^* \cdot E[|S(\omega)|^2]$$

Similarly, given the frequency characteristic W(ω) of noise and the frequency characteristic S(ω) are uncorrelated, then, $E[W(\omega) \cdot S(\omega)^*] = 0$ and $E[S(\omega)^* \cdot W(\omega)] = 0$. Therefore, if equation (8) is substituted into the denominator on the right side of the above-mentioned equation (7), the following equation (10) can be obtained.

$$E[|X(\omega)|^2] = E[(H(\omega)S(\omega) + W(\omega))(H(\omega)S(\omega) + W(\omega))^*] \quad (10)$$

$$= E[H(\omega)S(\omega)H(\omega)^*S(\omega)^* + H(\omega)S(\omega)W(\omega)^* +$$

$$W(\omega)H(\omega)^*S(\omega)^* + W(\omega)W(\omega)^*]$$

$$= E[|H(\omega)S(\omega)|^2] + E[|W(\omega)|^2]$$

-continued $$= E[|H(\omega)|^2|S(\omega)|^2] + E[|W(\omega)|^2]$$

$$= |H(\omega)|^2 \cdot E[|S(\omega)|^2] + E[|W(\omega)|^2]$$

The frequency characteristic R(ω) depicted in the following equation (11) can be obtained from the above-mentioned equations (7), (9), and (10).

$$R(\omega) = \frac{H(\omega)^* \cdot E[|S(\omega)|^2]}{|H(\omega)|^2 \cdot E[|S(\omega)|^2] + E[|W(\omega)|^2]} \quad (11)$$

The inverse transform filter based on the frequency characteristic R(ω) depicted in equation (11) is an optimal filter that minimizes the mean square error depicted in the above-mentioned equation (2) when the noise of the image processing system is taken into account. Here, $E[|S(\omega)|^2]$ is the mean value of the power spectrum of the ideal image, $E[|W(\omega)|^2]$ is the mean value of the power spectrum of noise, and $|H(\omega)|^2$ is the power spectrum of the frequency characteristic of the optical system.

Moreover, if the frequency characteristic R(ω) depicted in the above-mentioned equation (11) is applied, when the square error between each pixel of an image after the inverse transformation process and each pixel of the ideal image is integrated in the frequency domain, the following equation (12) of the mean square error MSE (Mean Square Error) can be obtained.

$$\begin{aligned}
MSE &= \int |S(\omega) - R(\omega) \cdot X(\omega)|^2 d\omega \\
&= \int |S(\omega) - R(\omega) \cdot \{H(\omega)S(\omega) + W(\omega)\}|^2 d\omega \\
&= \int |(1 - R(\omega)H(\omega))S(\omega) - R(\omega)W(\omega)|^2 d\omega \\
&= \int \{(1 - R(\omega)H(\omega))S(\omega) - R(\omega)W(\omega)\} \\
&\quad \{(1 - R(\omega))S(\omega) - R(\omega)W(\omega)\}^* d\omega \\
&= \int \{|(1 - R(\omega)H(\omega))S(\omega)|^2 - S(\omega)R(\omega)^*W(\omega)^*(1 - R(\omega)H(\omega)) - \\
&\quad R(\omega)W(\omega)S(\omega)^*(1 - R(\omega)H(\omega))^* + |R(\omega)W(\omega)|^2\} d\omega \\
&= \{|1 - R(\omega)H(\omega)|^2|S(\omega)|^2 + |R(\omega)|^2|W(\omega)|^2\} d\omega
\end{aligned} \quad (12)$$

In the computation of the above equation (12), the uncorrelation between the frequency characteristic W(ω) of noise and the frequency characteristic S(ω) is used as described above. The first term on the rightmost side of equation (12) indicates the amount of error which could not be restored, of the image after the inverse transformation process. The second term indicates the amount of error by noise.

A frequency characteristic H(ω) of the optical system is designed such that the integral of equation (12) has a minimum value. Accordingly, it is possible to obtain a combination of an optical system and an inverse transform filter that minimizes the mean square error in the frequency domain depicted in the above-mentioned equation (4). Moreover, it is possible to obtain a combination of an optical system and an inverse transform filter that minimizes the mean square error in the actual space depicted in the above-mentioned equation (2), based on the Parseval's theorem.

<Regarding Frequency Characteristic R' of Local Inverse Transform Filter>

Figure 8:
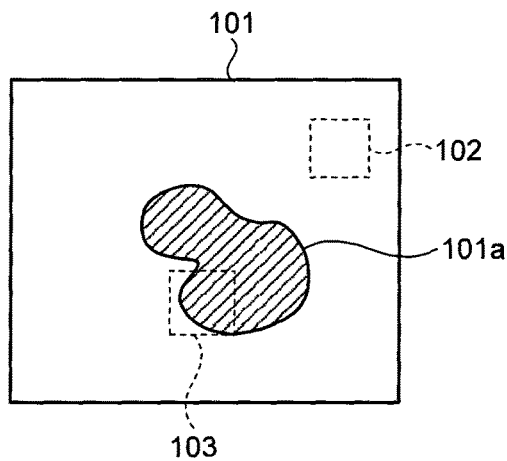
FIG. 8 is a diagram explaining that power spectra are different between areas of a detected image.
Figure 9:
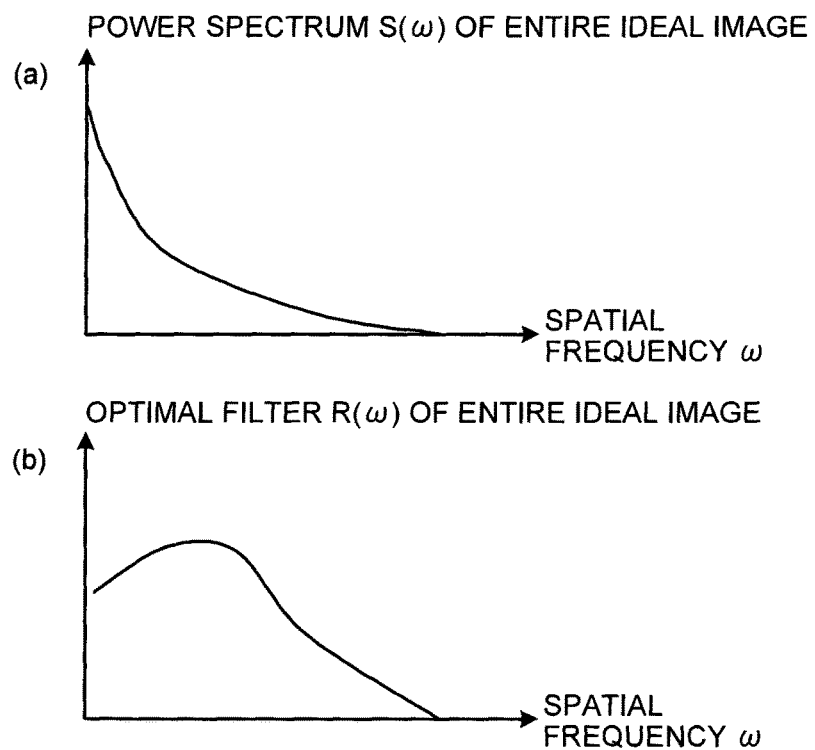
FIG. 9 is a diagram explaining a power spectrum and an optimal filter in the entire detected image.

FIG. 8 is a diagram explaining that power spectra are different between areas of the detected image. FIG. 9 is a diagram explaining a power spectrum and an optimal filter in the entire detected image. FIG. 10 is a diagram explaining a power spectrum and an optimal filter in an area of a flat portion of the detected image. FIG. 11 is a diagram explaining a power spectrum and an optimal filter in an area of a texture portion of the detected image. A description is given of a frequency characteristic R'(ω) of a local inverse transform filter, with reference to FIGS. 8 to 11.

Suppose that the frequency characteristic S(ω) in equation (11) for obtaining the above-mentioned frequency characteristic R(ω) of the inverse transform filter is known. In other words, it can be said to be the frequency characteristic of the entire ideal image. However, as illustrated in FIG. 8, the detected image 101 which is an image actually captured by the actual image capturing device 12 contains a texture portion 101a, and a flat portion different from the texture portion 101a. In the above-mentioned description, a description has been given of the operation of executing the filtering process using the frequency characteristic R(ω) of the inverse transform filter illustrated in FIG. 9(b) by which the MSE depicted in the above-mentioned equation (12) is minimized based on the known frequency characteristic S(ω) of the entire ideal image illustrated in FIG. 9(a). When the filtering process is executed based on the frequency characteristic R(ω), the MSE depicted in the above-mentioned equation (12) can surely be minimized in the entire detected image 101. However, for example, in an area 102, which is the flat portion in the detected image 101, the domain of the spatial frequency ω of a part without a spectrum is also amplified so that unnecessary noise increases.

As illustrated in FIG. 10(a), suppose that the frequency characteristic of a local area corresponding to the area 102 in the ideal image is S'(ω). The frequency characteristic R'(ω) of a local inverse transform filter that amplifies only the domain of the spatial frequency ω where the spectrum of a frequency characteristic S'(ω) exists (the low frequency domain) and gives the minimum MSE in the area 102 is conceivable (see FIG. 10(b)).

Moreover, as illustrated in FIG. 11(a), the spectrum of the frequency characteristic S'(ω) of a local area corresponding to an area 103 in the ideal image exists up to the high frequency domain of the spatial frequency ω, in the area 103 including the texture portion 101a. Therefore, regarding the frequency characteristic S'(ω) of the area 103, the frequency characteristic R'(ω) of a local inverse transform filter that performs amplification up to the high frequency domain and gives the minimum MSE in the area 103 is conceivable (see FIG. 11(b)).

IBy deriving the frequency characteristic R'(ω) that applies the inverse transform filter locally is derived as the image filtering process in this manner, it is possible to suppress the amplification of noise and improve reproducibility of texture of an image. Hereinafter, a description is given of the frequency characteristic R'(ω) of the local inverse transform filter and a frequency characteristic K(ω) that is derived to simplify the computation of the filtering process with the frequency characteristic R'(ω).

Firstly, when the frequency characteristic S(ω) in the equation to obtain the frequency characteristic R(ω) depicted in the above-mentioned equation (11) is replaced with the frequency characteristic S'(ω) of a local area of the ideal image, the frequency characteristic R'(ω) depicted in the following equation (13) that gives the minimum MSE of the local area can be obtained.

$$R'(\omega) = \frac{H(\omega)^* \cdot E[|S'(\omega)|^2]}{|H(\omega)|^2 \cdot E[|S'(\omega)|^2] + E[|W(\omega)|^2]} \quad (13)$$

By obtaining the frequency characteristic R'(ω) for each detected image and each local area (each pixel) of the detected image, it is possible to obtain the minimum MSE of a local area and suppress the increase of noise compared with when executing the filtering process by the inverse transform filter based on the frequency characteristic R(ω) common to the entire detected image. The local area where the frequency characteristic R' (ω) is obtained is not limited to each pixel but may be each predetermined pixel group (predetermined part) of a detected image.

Here, the frequency characteristic S'(ω) in equation (13) cannot be obtained directly from the detected image. Accordingly, the above-mentioned equation (8) is used to define the mean value $E[|S'(\omega)|^2]$ of a local power spectrum of the ideal image as in the following equation (14).

$$E[|S'(\omega)|^2] = E\left[\left|\frac{X'(\omega) - W(\omega)}{H(\omega)}\right|^2\right] \approx E\left[\left|\frac{X'(\omega)}{H(\omega)}\right|^2\right] \quad (14)$$

Here, X'(ω) is the frequency characteristic of a local area (pixel) of a detected image. An approximation from the relationship of X'(ω)>>W(ω) is made in equation (14). In other words, the noise components of a captured image are assumed to be sufficiently smaller than a pixel. Moreover, the mean value $E[|S'(\omega)|^2]$ is more correctly expressed by the following equation (15) when the frequency characteristic R(ω) of the inverse transform filter that gives a frequency characteristic X(ω) the minimum MSE with respect to the frequency characteristic S(ω) is used.

$$E[|S'(\omega)|^2] \approx E[|R(\omega)X'(\omega)|^2] \quad (15)$$

Next, the model of noise is considered as follows: the noise of the captured image is defined as in the following equation (16), considering that the noise of the captured image includes noise having a constant amplitude regardless of the pixel, and noise having an amplitude proportional to the pixel.

$$E[|w(n)|^2] = E[|kx(n)|^2 + |c|^2] = E[k^2|x(n)|^2 + |c|^2] \quad (16)$$

Here, k is the constant of proportionality of the noise having an amplitude proportional to a pixel of the detected image, and c is the noise component having a constant amplitude that does not depend on pixels of the detected image. When equation (16) is transformed into the frequency domain, the following equation (17) is given by the Parseval's theorem.

$$E[|W(\omega)|^2] = E[k^2|X(\omega)|^2 + |c|^2] \quad (17)$$

When the above-mentioned equations (15) and (16) are substituted into equation (13), the following equation (18) can be obtained.

$$R'(\omega) = \frac{H(\omega)^* \cdot E[|R(\omega)X'(\omega)|^2]}{|H(\omega)|^2 \cdot E[|R(\omega)X'(\omega)|^2] + E[k^2|X(\omega)|^2 + |c|^2]} \quad (18)$$

Here, k and c can be obtained by the analysis of the detected image of a gray scale chart, and using their values, the frequency characteristic R'(ω) of the local inverse transform filter that gives the minimum MSE can be obtained.

In the actual circuit implementation, it is possible to realize the above-mentioned local inverse transform filter by directly computing the frequency characteristic R'(ω) of the local inverse transform filter on a pixel basis, but the computation load of obtaining the local inverse transform filter is heavy. Accordingly, the following method is used to reduce the computation load. In the following, the component of $k^2|x(n)|^2$ which is the noise having an amplitude proportional to a pixel of the detected image depicted in equation (16) is omitted. However, the same effect can be obtained by adding the same term to the power spectrum $|W(\omega)|^2$ of the noise in a derived equation.

Firstly, equation (13) is transformed as in the following equation (19).

$$R'(\omega) = \frac{H(\omega)^*}{|H(\omega)|^2 + E\left[\frac{|W(\omega)|^2}{|S'(\omega)|^2}\right]} \quad (19)$$

Given that the ratio of the frequency characteristic R'(ω) of the local inverse transform filter to the frequency characteristic R(ω) of the inverse transform filter be K(ω). K(ω) is expressed by the following equation (20).

$$K(\omega) = \frac{R'(\omega)}{R(\omega)} = \frac{\frac{|H(\omega)|^2}{E[|W(\omega)|^2]} + E\left[\frac{1}{|S(\omega)|^2}\right]}{\frac{|H(\omega)|^2}{E[|W(\omega)|^2]} + E\left[\frac{1}{|S'(\omega)|^2}\right]} \quad (20)$$

Considering obtaining the frequency characteristic R'(ω) of the local inverse transform filter from the frequency characteristic R(ω) that has been obtained in advance, and K(ω) depicted in equation (20), the frequency characteristic R'(ω) can be obtained by the following equation (21).

$$R'(\omega) = K(\omega)R(\omega) \quad (21)$$

In other words, by operating a filter based on the characteristic K(ω) (hereinafter referred to as the correction filter) in series with the inverse transform filter based on the frequency characteristic R(ω) that has been obtained in advance, a filtering process equivalent to the local inverse transform filter based on the frequency characteristic R'(ω) can be performed.

A(ω) is defined as depicted in the following equation (22) to simplify the equation.

$$A(\omega) = \frac{|H(\omega)|^2}{E[|W(\omega)|^2]} \quad (22)$$

When equation (22) is substituted into the above-mentioned equation (20), the frequency characteristic K(ω) of the correction filter can be obtained by the following equation (23).

$$K(\omega) = \frac{R'(\omega)}{R(\omega)} = \frac{A(\omega) + E\left[\frac{1}{|S(\omega)|^2}\right]}{A(\omega) + E\left[\frac{1}{|S'(\omega)|^2}\right]} \quad (23)$$

Suppose that noise is large, and is $A(\omega) \ll E[1/|S'(\omega)|^2]$ and $A(\omega) \ll E[1/|S(\omega)|^2]$. Equation (23) can be simplified and expressed as in the following equation (24).

$$K(\omega) = \frac{R'(\omega)}{R(\omega)} = \frac{E\left[\frac{1}{|S(\omega)|^2}\right]}{E\left[\frac{1}{|S'(\omega)|^2}\right]} = \frac{E[|S'(\omega)|^2]}{E[|S(\omega)|^2]} \quad (24)$$

Furthermore, suppose that the typical spectrum of the subject is the uniform distribution, and is $E[|S(\omega)|^2]=1$. Equation (24) is further simplified and expressed as in the following equation (25).

$$K(\omega) = \frac{R'(\omega)}{R(\omega)} = E[|S'(\omega)|^2] \quad (25)$$

Considering a case where $A(\omega) \ll E[1/|S'(\omega)|^2]$ and $A(\omega) \ll E[1/|S(\omega)|^2]$ do not hold practically, it is also possible to introduce the constant of proportionality t as depicted in the following equation (26) and express the frequency characteristic $K(\omega)$.

$$K(\omega) = \frac{R'(\omega)}{R(\omega)} = t \cdot E[|S'(\omega)|^2] \quad (26)$$

Moreover, the mean value $E[|S'(\omega)|^2]$ of the local power spectrum of the ideal image in equations (23) to (26) for computing the frequency characteristic $K(\omega)$ of the correction filter can be obtained by the above-mentioned equation (15).

As described above, the frequency characteristic $R'(\omega)$ of the local inverse transverse filter can be obtained by multiplying the frequency characteristic $R(\omega)$ of the inverse transverse filter that has been obtained in advance, and the frequency characteristic $K(\omega)$ of the correction filter calculated by equations (23) to (26). Accordingly, the computation load can be reduced.

<Configuration and Operation of Filter Processing Unit>

Figure 12:
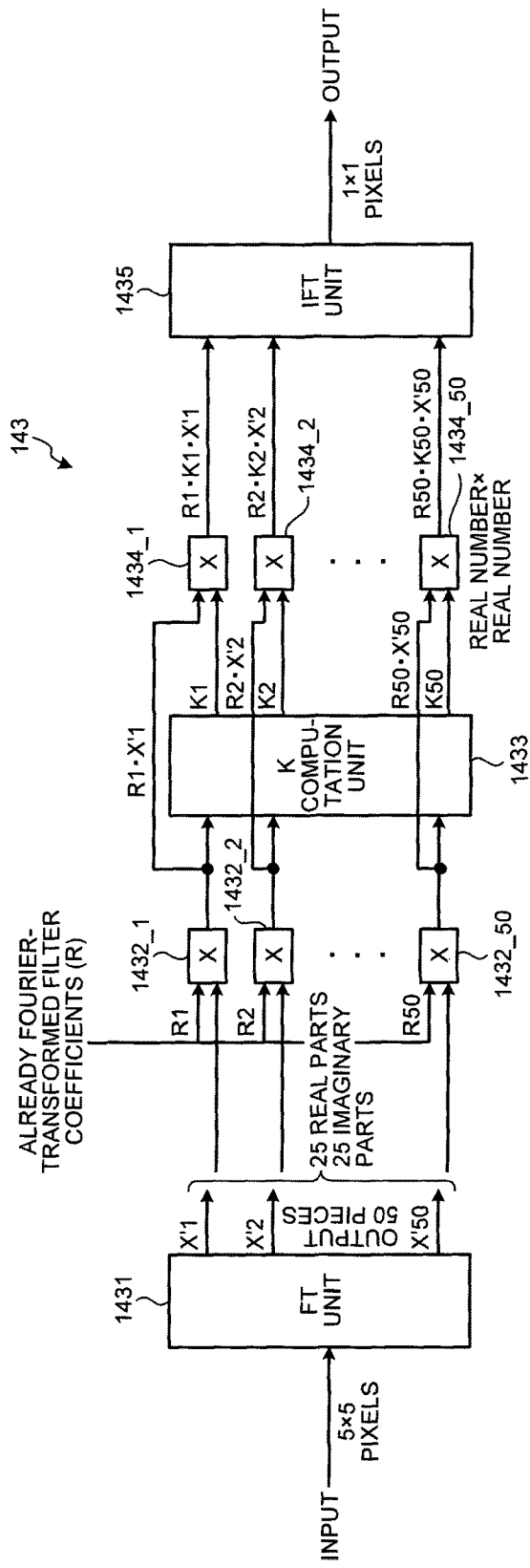
FIG. 12 is a diagram explaining an example of the configuration of, and the operation of a filter processing unit of the image processing unit of the first embodiment.

FIG. 12 is a diagram explaining an example of the configuration of, and the operation of the filter processing unit of the image processing unit of the first embodiment. The configuration and operation of the filter processing unit 143 of the image processing unit 14 are described with reference to FIG. 12.

As illustrated in FIG. 12, the filter processing unit 143 includes a FT (Fourier Transform) unit 1431, multipliers 1432_1 to 1432_50, a K computation unit 1433, multipliers 1434_1 to 1434_50, and an IFT (Inverse Fourier Transform) unit 1435.

For example, 5×5 pixels are input into the FT unit 1431 and the FT unit 1431 executes the Fourier transform for transformation into the frequency domain. As a consequence, the FT unit 1431 converts 5×5 pixels, that is, 25 pieces of data into 25 complex numbers, and outputs 25 pieces of actual part data and 25 pieces of imaginary part data (collectively expressed as data X'1 to X'50).

Each of the multipliers 1432_1 to 1432_50 multiplies two pieces of input data and outputs the result. The same applies to the multipliers 1434_1 to 1434_50.

The K computation unit 1433 outputs the frequency characteristic $K(\omega)$ of the correction filter from the multiplied value of the input frequency characteristic $R(\omega)$ and X'($\omega$), based on any of the above-mentioned equations (15) and (23) to (26). The K Computation unit 1433 may be configured to refer to a look-up table in which the value of the frequency characteristic $K(\omega)$ and the multiplied value of the frequency characteristic $R(\omega)$ and X'($\omega$), that is, the frequency characteristic S'($\omega$) are associated, and obtain the frequency characteristic $K(\omega)$.

The IFT unit 1435 executes the inverse Fourier transform that converts multiplied values (values in the frequency domain) output from the multipliers 1434_1 to 1434_50 into a value in the real space, and outputs a 1×1 pixel. The pixel output from the IFT unit 1435 corresponds to a pixel obtained by performing the filtering process by the inverse transform filter based on the frequency characteristic R'($\omega$), on the 5×5 pixels of the detected image.

Next, the flow of a series of operations of the filter processing unit 143 is described. Firstly, an image (detected image) captured by the image capturing device 12 is buffered by the image buffer unit 141 as described above. Five pixels are output from the image buffer unit 141. Therefore, 5×5 pixels are assumed to be input into the FT unit 1431 of the filter processing unit 143 as a unit from the image buffer unit 141. The FT unit 1431 executes the Fourier transform based on the input 5×5 pixels for transformation into the frequency domain, converts them into 25 complex numbers, and outputs the data X'1 to X'50 which is 25 pieces of actual part data and 25 pieces of imaginary part data.

Next, the data X'1 output from the FT unit 1431, and a filter coefficient R1 corresponding to the data X'1, and derived from the frequency characteristic R($\omega$) of the inverse transform filter are input into the multiplier 1432_1. The multiplier 1432_1 multiplies the data X'1 and the filter coefficient R1, and outputs the multiplied value R1·X'1. Similarly, the data X'2 to X'50 output from the FT unit 1431 and filter coefficients R2 to R50 are input into the multipliers 1432_2 to 1432_50, and the multipliers 1432_2 to 1432_50 output their multiplied values R2·X'2 to R50·X'50.

Next, the K computation unit 1433 computes filter coefficients K1 to K50 which are the coefficients of the correction filter based on the frequency characteristic K($\omega$), from the input multiplied values R1·X'1 to R50·X'50, respectively, based on any of the above-mentioned equations (15) and (23) to (26).

Next, the multiplier 1434_1 multiplies the multiplied value R1·X'1 output from the multiplier 1432_1 and the filter coefficient K1 output from the K computation unit 1433, and outputs data R1·K1·X'1. Similarly, the multipliers 1434_2 to 1434_50 multiply the multiplied values R2·X'2 to R50·X'50 output from the multipliers 1432_2 to 1432_50, and the filter coefficients K2 to K50 output from the K computation unit 1433, and output data R2·K2·X'2 to R50·K50·X'50, respectively.

The IFT unit 1435 then executes the inverse Fourier transform that converts the data R1·K1·X'1 to R50·K50·X'50 output from the multipliers 1434_1 to 1434_50, respectively, into a value in the real space, and outputs a 1×1 pixel. As described above, the pixel output from the IFT unit 1435 corresponds to a pixel obtained by performing the filtering process on the pixels of the 5×5 partial image of the detected image, using the inverse transform filter based on the frequency characteristic R'(ω) corresponding to the pixel at the center of the 5×5 pixels.

As described above, the frequency characteristic R'(ω) of the inverse transform filter is obtained for each detected image captured by the image capturing device 12, and each local area (each pixel) of the detected image. The filtering process is executed for each local area (each pixel) by the inverse transform filter based on the frequency characteristic R'(ω). Accordingly, the minimum MSE (mean square error) can be obtained for each local area, and the increase of noise can be suppressed compared with when executing the filtering process by the inverse transform filter based on the frequency characteristic R(ω) common to the entire detected image.

Moreover, the frequency characteristic R'(ω) of the local inverse transform filter is defined as K(ω)·R(ω) as depicted in the above-mentioned equation (21). A filter circuit is configured by separating the process of the inverse transform filter based on the frequency characteristic R(ω) and the process of the correction filter based on the frequency characteristic K(ω). Furthermore, a circuit deriving the frequency characteristic K(ω) is configured based on the formulae depicted in the above-mentioned equations (23) to (26). Consequently, it is possible to reduce the computation load and simplify a filter circuit to be implemented, compared with the case where the frequency characteristic R'(ω) is derived directly on a pixel basis.

As described in FIGS. 6 and 12, the image buffer unit 141 outputs five pixels. The 5×5 pixels are input into the filter processing unit 143 and the filter processing unit 143 executes the filtering process with 5×5 taps. However, the number of taps is not limited to this. In other words, the number of taps of the filtering process may be different, for example, 3×3, 11×11 or, 21×21. In this case, the number of taps of the filter needs to be an odd number so that there is a central pixel in a pixel group input into the filter processing unit 143 targeted for the inverse transformation process by the filter.

Second Embodiment

An image capturing system and an image capturing apparatus according to a second embodiment are described, focusing on different points from the configurations and operations of the image capturing system and the image capturing apparatus according to the first embodiment.

The configuration of the image capturing system according to the embodiment is similar to the configuration of the image capturing system 500 according to the first embodiment illustrated in FIG. 1. Moreover, the configuration of the PC of the embodiment is similar to the configuration illustrated in FIG. 2. Moreover, the configuration of the image capturing apparatus of the embodiment is similar to the configuration illustrated in FIG. 3. However, in the embodiment, the filter processing unit 143 of the image processing unit 14 illustrated in FIG. 4 is replaced with a filter processing unit 143a described below and illustrated in FIG. 13.

<Configuration and Operation of Filter Processing Unit>

Figure 13:
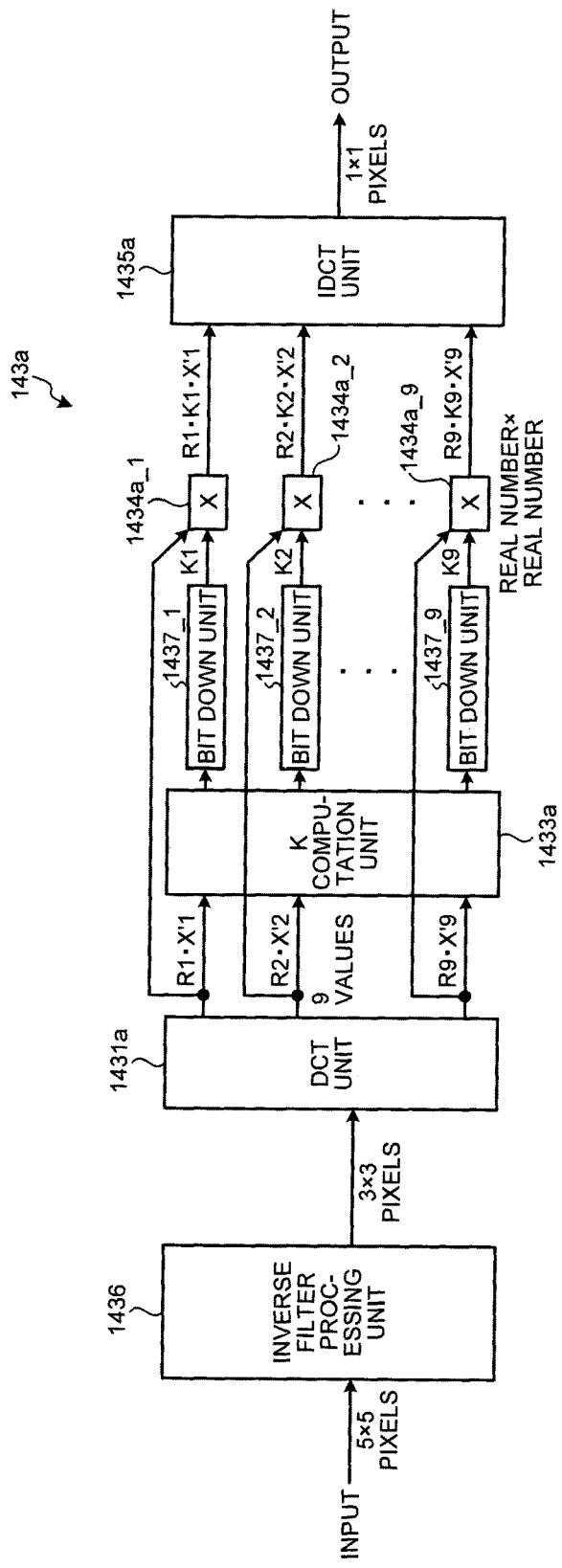
FIG. 13 is a diagram explaining an example of the configuration, and the operation of a filter processing unit of an image processing unit of a second embodiment.
Figure 16:
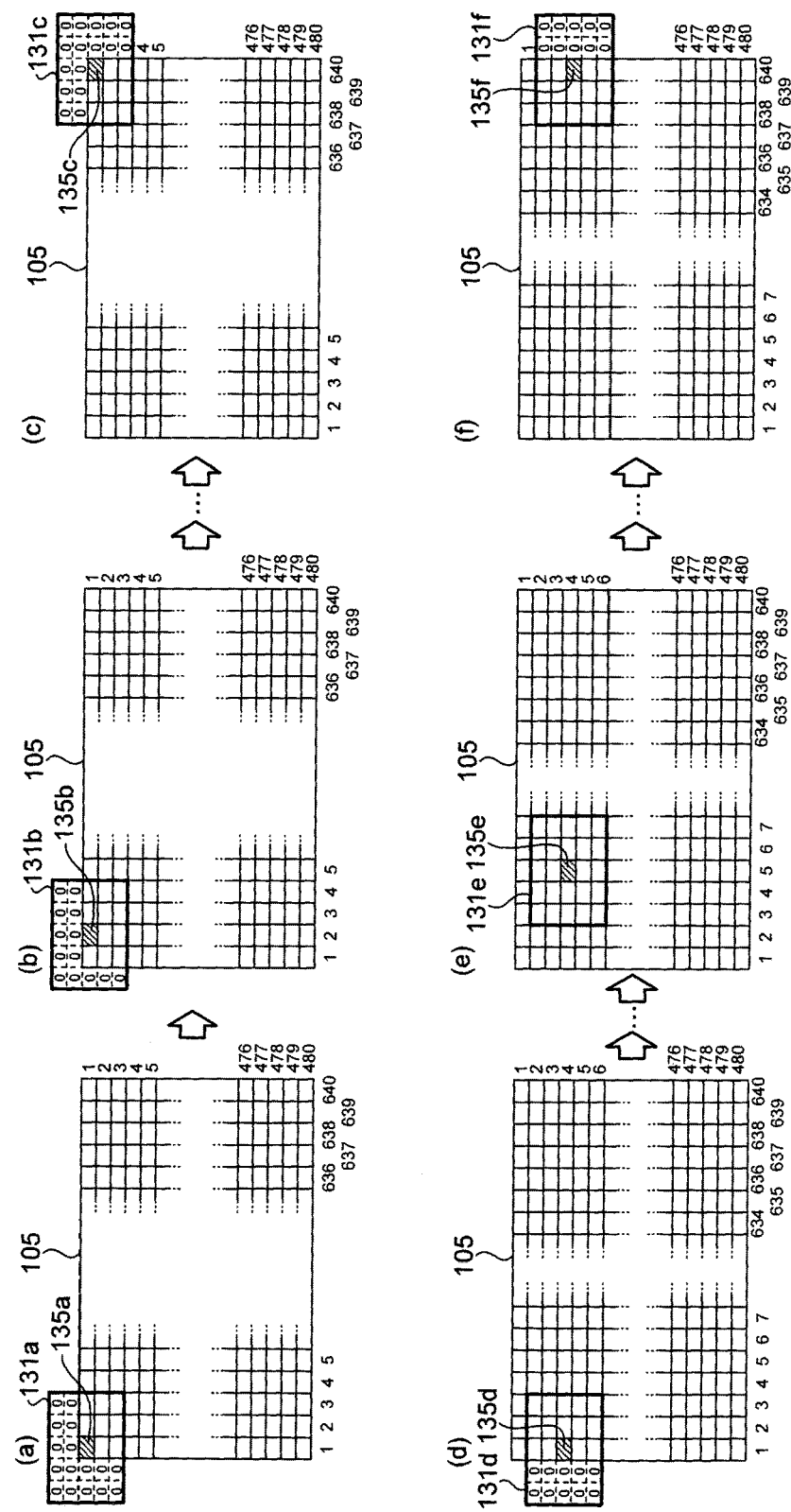
FIG. 16 is a diagram explaining the operation of scanning a target partial image targeted for the filtering process of the inverse transform filter in the image.

FIG. 13 is a diagram explaining an example of the configuration of, and the operation of the filter processing unit of the image processing unit of the second embodiment. FIG. 14 is a diagram illustrating an example of the configuration of an inverse transform filter. FIG. 15 is a diagram explaining performing a filtering process on an image by the inverse transform filter. FIG. 16 is a diagram explaining the operation of scanning a target partial image targeted for the filtering process of the inverse transform filter in the image.

The configuration and operation of the filter processing unit 143a of the image processing unit 14 are described with reference to FIGS. 13 to 16.

As illustrated in FIG. 13, the filter processing unit 143a includes an inverse filter processing unit 1436, a DCT (Discrete Cosine Transform: discrete cosine transform) unit 1431a, a K computation unit 1433a, bit down units 1437_1 to 1437_9, multipliers 1434a_1 to 1434a_9, and an IDCT (Inverse Discrete Cosine Transform: inverse discrete cosine transform) unit 1435a.

For example, 5×5 pixels are input into the inverse filter processing unit 1436 and the inverse filter processing unit 1436 executes the filtering process (inverse transformation process) by the inverse transform filter based on the frequency characteristic R(ω) derived by the above-mentioned equation (11).

For example, 3×3 pixels are input into the DCT unit 1431a, and the DCT unit 1431a executes the discrete cosine transform to transform it into the frequency domain, for an image on which the filtering process has been performed by the inverse filter processing unit 1436. As a consequence, the DCT unit 1431a converts 3×3 pixels, that is, nine pieces of data into nine values in the frequency domain, and outputs them. The 3×3 pixels input into the DCT unit 1431a are pixels on which the filtering process has been performed by the inverse transform filter based on the frequency characteristic R(ω) by the inverse filter processing unit 1436. Accordingly, in the embodiment, the nine values of the frequency domain output by the DCT unit 1431a are denoted as the multiplied values R1·X'1 to R9·X'9.

The K computation unit 1433a outputs the frequency characteristic K(ω) of the correction filter from the multiplied value of the input frequency characteristic R(ω) and X'(ω) based on any of the above-mentioned equations (15) and (23) to (26). Specifically, the K computation unit 1433a computes the filter coefficients K1 to K9 which are the coefficients of the correction filter based on the frequency characteristic K(ω) from the input multiplied values R1·X'1 to R9·X'9, respectively, based on any of the above-mentioned equations (15) and (23) to (26). The K computation unit 1433a may be configured to obtain the frequency characteristic K(ω) by referring to a look-up table in which the value of the frequency characteristic K(ω) and the values of the frequency characteristic R(ω) and X'(ω) are associated.

The bit down units 1437_1 to 1437_9 reduce the quantization bit rates for the filter coefficients K1 to K9, respectively, output from the K computation unit 1433a. This is because the filter coefficients K1 to K9 have hardly any influence on the deterioration of an image even if the quantization bit rates are reduced and the filtering process by the correction filter is executed. Therefore, the quantization bit rates of the filter coefficients K1 to K9 are reduced by the bit down units 1437_1 to 1437_9, and accordingly the computation load by the downstream multipliers 1434a_1 to 1434a_9 can be reduced.

Each of the multipliers 1434a_1 to 1434a_9 multiplies two pieces of input data and outputs the result.

The IDCT unit 1435a executes the inverse discrete cosine transform that converts multiplied values (values in the frequency domain) output from the multipliers 1434a_1 to 1434a_9 into a value in the real space, and outputs a 1×1 pixel. The pixel output from the IDCT unit 1435a corresponds to a pixel obtained by performing the filtering process on the 5×5 pixels of the detected image by the inverse transform filter based on the frequency characteristic R'(ω).

Next, the flow of a series of operations of the filter processing unit 143a is described. Firstly, an image (detected image) captured by the image capturing device 12 is buffered by the image buffer unit 141 as described above. Five pixels are output from the image buffer unit 141. Therefore, 5×5 pixels are assumed to be input into the inverse filter processing unit 1436 of the filter processing unit 143a as a unit from the image buffer unit 141. A description is given in detail of the operation of the filtering process by the inverse transform filter based on the frequency characteristic R(ω) in the inverse filter processing unit 1436, with reference to FIGS. 14 to 16.

As illustrated in FIG. 14, the filter used for the inverse transformation process is an inverse transform filter 121 which is a linear filter having 5×5 taps configured by filter coefficients a11 to a15, a21 to a25, a31 to a35, a41 to a45, and a51 to a55. Moreover, a part of an image targeted for the inverse transformation process by the inverse transform filter 121 is assumed to be a target partial image 131 illustrated in FIG. 15. The target partial image 131 is a 5×5 partial image including pixels A11 to A15, A21 to A25, A31 to A35, A41 to A45, and A51 to A55.

As illustrated in FIG. 15, the filtering process by the inverse transform filter finds a value obtained by performing a convolution operation on the target partial image 131 by the inverse transform filter 121, in other words, the computed value expressed in equation (27). The computed value of the convolution operation is a value obtained by executing the inverse transformation process on central data which is a pixel located at the center of the target partial image 131. In other words, the computed value of convolution is a pixel at a location corresponding to the central data of the image before the inverse transformation process, in the image after the inverse transformation process.

Next, in terms of the inverse transformation process of the inverse filter processing unit 1436, an outline of the operation of performing the inverse transformation process while scanning a horizontal line in the X direction in an image 105 is described with reference to FIG. 16. FIG. 16(a) illustrates a state where the inverse filter processing unit 1436 performs the inverse transformation process on the pixel (1, 1) in the image 105 by the inverse transform filter 121. As illustrated in FIG. 16(a), a target partial image 131a having the pixel (1, 1) as central data and pixels of a part overlapping with the image 105 are required to perform a convolution operation with the pixel (1, 1) as central data 135a. In other words, pixels corresponding to the pixels A33 to A35, A43 to A45, and A53 to A55 of the target partial image 131 illustrated in FIG. 15 are required in the target partial image 131a.

For this purpose, the pixels corresponding to the pixels A33 to A35, A43 to A45, and A53 to A55 need to have been output from the output sections 1413a to 1413c of the image buffer unit 141. In the target partial image 131a, pixels in a part that does not overlap with the image 105 are assumed to be handled as "0".

In the above state, the inverse filter processing unit 1436 performs a convolution operation on the target partial image 131a by the inverse transform filter 121 similarly to the convolution operation illustrated in FIG. 15. The inverse filter processing unit 1436 outputs the value obtained by performing the convolution operation for the pixel (1, 1) which is the central data 135a of the target partial image 131a of the image 105, as the pixel (1, 1) of the image after the inverse transformation process.

Next, as illustrated in FIG. 16(b), the inverse filter processing unit 1436 changes the target pixel of the convolution operation by shifting by one along the X direction and performs the inverse transformation process on the pixel (2, 1) which is central data 135b of a target partial image 131b. The inverse filter processing unit 1436 then repeats the convolution operation while shifting along the horizontal line in the X direction, and performs the inverse transformation process on the pixel (640, 1) which is the last pixel in the horizontal line in the X direction as illustrated in FIG. 16(c). As illustrated in FIG. 16(c), the pixel (640, 1) is central data 135c of a target partial image 131c.

As described above, the inverse filter processing unit 1436 repeats the convolution operation while shifting along the horizontal line in the X direction. When the inverse transformation process on the last pixel in the horizontal line ends, the inverse filter processing unit 1436 similarly performs the inverse transformation process on the next horizontal line in the Y direction.

FIGS. 16(d) to 16(f) illustrate a state where the inverse filter processing unit 1436 performs the inverse transformation process on the pixels in the fourth horizontal line in the Y direction in the image 105. FIG. 16(d) illustrates a state where the inverse filter processing unit 1436 performs the inverse transformation process on the pixel (1, 4) in the image 105 by the inverse transform filter 121. As illustrated in FIG. 16(d), target partial image 131d having the pixel (1, 4) as central data, and pixels in a part that overlaps with the image 105 are required to perform the convolution operation with the pixel (1, 4) as central data 135d. In the target partial image 131d, pixels in a part that does not overlap with the image 105 are assumed to be handled as "0" as in the above description.

FIG. 16(e) illustrates a state where the inverse filter processing unit 1436 performs the inverse transformation process on the pixel (5, 4) in the image 105 by the inverse transform filter 121. As illustrated in FIG. 16(e), an entire target partial image 131e having the pixel (5, 4) as central data 135e overlaps with the image 105, and accordingly the inverse filter processing unit 1436 can perform the inverse transformation process using all the pixels included in the target partial image 131e.

The inverse filter processing unit 1436 then repeats the convolution operation while shifting along the horizontal line in the X direction, and performs the inverse transformation process on the pixel (640, 4) which is the last pixel in the horizontal line in the X direction as illustrated in FIG. 16(f). As illustrated in FIG. 16(f), the pixel (640, 4) is central data 135f of a target partial image 131f.

As described above, pixels in a part that does not overlap with the image 105 are set to "0" in a target partial image of the image 105, the target partial image being targeted for the convolution operation by the inverse transform filter 121, but are not limited to this. For example, as the pixels in the part of the target partial image that does not overlap with the image 105, pixels of a case of folding over pixels in the part of the target partial image that overlaps with the image 105 with respect to central data of the target partial image as a reference may be used.

Specifically, a description is given taking the target partial image 131a of FIG. 16(a) as an example. Suppose that the names of pixels of the target partial image 131a are similar to those of the pixels of the target partial image 131 illustrated in FIG. 15. In this case, pixels in the part which does not overlap the image 105 of the target partial image 131a are the pixels A11 to A15, A21 to A25, A31, A32, A41, A42, A51, and A52. Moreover, pixels in the part which overlaps the image 105 of the target partial image 131a are the pixels A33 to A35, A43 to A45, and A53 to A55.

At this time, for the pixels A31, A32, A41, A42, A51, and A52, the values of the pixels A35, A34, A45, A44, A55, and A54, respectively, may be used by folding over the pixels in the part which overlaps the image 105 of the target partial image 131a with respect to the central data as a reference. Moreover, for the pixels A13 to A15 and A23 to A25, the values of the pixels A53 to A55 and A43 to A45, respectively, may be used by folding over the pixels in the part which overlaps with the image 105 of the target partial image 131a with respect to the central data as a reference. For the pixels A11, A12, A21, and A22, the values of pixels in a point symmetrical position relationship among the pixels in the part which overlaps with the image 105 of the target partial image 131a with respect to the central data as a reference, in other words, A55, A54, A45, and A44 may be used. In such a method as described above, each pixel of a target partial image may be determined.

Next, in terms of the image on which the filtering process has been performed by the inverse filter processing unit 1436 as described above, 3×3 pixels are input into the DCT unit 1431a, the DCT unit 1431a executes the discrete cosine transform to transform it into the frequency domain, and outputs the multiplied values R1·X'1 to R9·X'9 which are nine values in the frequency domain. In this manner, while the number of pieces of output data after the transformation into the frequency domain by the FT unit 1431 illustrated in FIG. 12 in the first embodiment is double the number of pieces of input data, the number of pieces of output data is the same as the number of pieces of input data in a transformation into the frequency domain by the DCT unit 1431a. Therefore, a circuit downstream of the DCT unit 1431a can be simplified. Naturally, the FT unit and the IFT unit may be used similarly to those illustrated in the first embodiment instead of the DCT unit 1431a and the IDCT unit 1435a.

Next, the K computation unit 1433a computes the filter coefficients K1 to K9 which are the coefficients of the correction filter based on the frequency characteristic K($\omega$), from the input multiplied values R1·X'1 to R9·X'9, respectively, based on any of the above-mentioned equations (15) and (23) to (26).

Next, the bit down units 1437_1 to 1437_9 reduce the quantization bit rates for the filter coefficients K1 to K9, respectively, output from the K computation unit 1433, and output the filter coefficients K1 to K9, respectively, having the reduced quantization bit rates.

Next, the multipliers 1434a_1 to 1434a_9 multiply the multiplied values R1·X'1 to R9·X'9 output from the DCT unit 1431a and the filter coefficients K1 to K9 output from the bit down units 1437_1 to 1437_9, respectively, and output the data R1·K1·X'1 to R9·K9·X'9, respectively.

The IDCT unit 1435a then executes the inverse discrete cosine transform that converts the data R1·K1·X'1 to R9·K9·X'9 output from the multipliers 1434a_1 to 1434a_9, respectively, into a value in the real space, and outputs a 1×1 pixel. As described above, the pixel output from the IDCT unit 1435a corresponds to a pixel obtained by performing the filtering process on the pixels of the 5×5 partial image of the detected image, using the inverse transform filter based on the frequency characteristic R'($\omega$) corresponding to the pixel at the center of the 5×5 pixels.

As described above, by using the configuration illustrated in FIG. 13 as the configuration of the filter processing unit 143a of the image processing unit 14, a similar effect to that of the first embodiment can be obtained.

Moreover, in the filter processing unit 143a illustrated in FIG. 13, after the filtering process is executed on 5×5 pixels of the detected image by the inverse transform filter based on the frequency characteristic R($\omega$) by the inverse filter processing unit 1436, the filtering process by the correction filter downstream of the DCT unit 1431a is executed on 3×3 pixels obtained by reducing the number of pixels from the filtered image. In other words, the number of taps of the correction filter is set to be smaller than the number of taps of the inverse transform filter based on the frequency characteristic R($\omega$). This is because even if the number of pieces of data input into the K computation unit 1433a is reduced to compute the filter coefficients of the correction filter by the K computation unit 1433a, there is hardly any influence on the deterioration of the image. Consequently, the filter circuit to be implemented can be further simplified.

The quantization bit rates of the filter coefficients output by the K computation unit 1433a are reduced by the bit down units 1437_1 to 1437_9. However, this is not essential. The bit down units 1437_1 to 1437_9 are not necessarily required to be provided. Moreover, it is also possible to apply the bit down units to the filter processing unit 143 of the first embodiment and place them downstream of the K computation unit 1433 in the filter processing unit 143.

An embodiment can restore blur which is optical aberration while suppressing noise.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

1 Image capturing apparatus
2 PC
3 Communication cable
4 Subject
11 Lens unit
11a Phase plate
11b Diaphragm
12 Image capturing device
14 Image processing unit
15 Communication unit
21 Communication unit
22 Operating unit
23 Display unit
24 Storage unit
25 External storage device
26 Control unit
27 Bus
101 Detected image
101a Texture portion
102, 103 Area
105 Image
121 Inverse transform filter
131, 131a to 131f Target partial image
135a to 135f Central data
141 Image buffer unit
143, 143a Filter processing unit
500 Image capturing system
1410 Input unit
1411a to 1411d Register
1412a to 1412d Line buffer
1413a to 1413e Output section
1431 FT unit
1431a DCT unit
1432_1 to 1432_50 Multiplier 1433, 1433a K computation unit
1434_1 to 1434_50 Multiplier
1434a_1 to 1434a_9 Multiplier
1435 IFT unit
1435a IDCT unit
1436 Inverse filter processing unit
1437_1 to 1437_9 Bit down unit
A Frame start period
B Horizontal blanking period
C Frame end period
D Vertical blanking period
T Valid data period

CITATION LIST

Patent Literature

Patent Literature 1: Japanese Patent Application Laid-open No. 2012-54795

The invention claimed is:
1. An image capturing apparatus comprising:
an optical system that gives aberration to incident light;
an image capturing sensor configured to convert the light that has passed through the optical system into pixels, and capture an image including the pixels; and
processing circuitry configured to perform a filtering process on the captured image based on a filter applicable to each predetermined portion of the captured image for compensating the aberration caused by the optical system, wherein the processing circuitry is configured to:
transform the captured image to a set of values in a frequency domain;
calculate a frequency characteristic of the filter in each predetermined portion using a value $E[|S'(\omega)|^2]$ of a local power spectrum of an ideal image corresponding to a frequency characteristic $S'(\omega)$ of a local part of the ideal image, the frequency characteristics $S'(\omega)$ being obtained by transforming pixels in the local part of the ideal image into the frequency domain, the local part corresponding to the respective predetermined portion and being smaller than the entire captured image;
generate a set of processed values by processing the set of values in the frequency domain based on the frequency characteristic of the filter; and
transform the set of processed values in the frequency domain to a filtered pixel corresponding to a pixel in the respective predetermined portion of the captured image,
wherein the processing circuitry is configured so that the frequency characteristic of the filter is a product of a frequency characteristic of a first filter for compensating the entire captured image for the aberration, and a frequency characteristic of a second filter for correcting the frequency characteristic of the first filter within the respective predetermined portion of the captured image.
2. The image capturing apparatus according to claim 1, wherein the processing circuitry is configured so that the filtering process minimizes a mean square error between a portion of the ideal image of a subject to which the respective predetermined portion of the captured image corresponds and a corresponding portion of an output image on which the filtering process has been performed.

3. The image capturing apparatus according to claim 1, wherein the processing circuitry is configured so that a frequency characteristic R' of the filter is calculated by a following equation:

$$R'(\omega) = \frac{H(\omega)^* \cdot E[|S(\omega)|^2]}{|H(\omega)|^2 \cdot E[|S'(\omega)|^2] + E[|W(\omega)|^2]}$$

(R': the frequency characteristic of the filter,
S': the frequency characteristic of the local part of the ideal image,
W: a frequency characteristic of a noise,
H: a frequency characteristic of a point spread function of the optical system, and
ω: spatial frequency).
4. The image capturing apparatus according to claim 1, wherein the processing circuitry is configured so that the frequency characteristic K of the second filter is calculated by a following equation:

$$K(\omega) = = \frac{\frac{|H(\omega)|^2}{E[|W(\omega)|^2]} + E\left[\frac{1}{|S(\omega)|^2}\right]}{\frac{|H(\omega)|^2}{E[|W(\omega)|^2]} + E\left[\frac{1}{|S'(\omega)|^2}\right]}$$

(K: the frequency characteristic of the second filter,
S: a frequency characteristic of an entire ideal image,
S': the frequency characteristic of the local part of the ideal image,
W: a frequency characteristic of a noise,
H: a frequency characteristic of a point spread function of the optical system, and
ω: spatial frequency).
5. The image capturing apparatus according to claim 1, wherein the processing circuitry is configured so that the frequency characteristic K of the second filter is calculated by a following equation:

$$K(\omega) = \frac{E[|S'(\omega)|^2]}{E[|S(\omega)|^2]}$$

(K: the frequency characteristic of the second filter,
S: a frequency characteristic of an entire ideal image,
S': the frequency characteristic of the local part of the ideal image, and
ω: spatial frequency).
6. The image capturing apparatus according to claim 1, wherein the processing circuitry is configured so that the frequency characteristic K of the second filter is calculated by a following equation:

$$K(\omega) = t \cdot E[|S'(\omega)|^2]$$

(K: the frequency characteristic of the second filter,
t: a constant of proportionality,
S': the frequency characteristic of the local part of the ideal image, and
ω: spatial frequency).
7. The image capturing apparatus according to claim 1, wherein the processing circuitry is configured so that the frequency characteristic of the local part of the ideal image is calculated based on processing a corresponding part of the captured image using the first filter.

8. The image capturing apparatus according to claim 1, wherein the processing circuitry is configured so that the frequency characteristic of the second filter is derived from a look-up table in which the frequency characteristic of the second filter is associated with a corresponding part of the ideal image.

9. The image capturing apparatus according to claim 1, wherein the processing circuitry is configured to:
transform the captured image to the set of values in the frequency domain using a discrete cosine transformation; and
transform the set of processed values in the frequency domain to the filtered pixel corresponding to the pixel in the respective predetermined portion of the captured image using an inverse discrete cosine transformation.

10. The image capturing apparatus according to claim 1, wherein the processing circuitry is configured so that a number of taps of the second filter is smaller than a number of taps of the first filter.

11. The image capturing apparatus according to claim 1, wherein the processing circuitry is configured to generate the set of processed values in the frequency domain by computation of values in a real number space.

12. An image capturing system comprising:
an image capturing apparatus including:
an optical system that causes aberration to incident light;
an image capturing sensor configured to convert the light that has passed through the optical system into pixels, and capture an image including the pixels; and
processing circuitry configured to perform a filtering process on the captured image based on a filter applicable to each predetermined portion of the captured image for compensating the aberration caused by the optical system, wherein the processing circuitry is configured to:
transform the captured image to a set of values in a frequency domain;
calculate a frequency characteristic of the filter in each predetermined portion using a value $E[|S'(\omega)|^2]$ of a local power spectrum of an ideal image corresponding to a frequency characteristic $S'(\omega)$ of a local part of the ideal image, the frequency characteristics $S'(\omega)$ being obtained by transforming pixels in the local part of the ideal image into the frequency domain, the local part corresponding to the respective predetermined portion and being smaller than the entire captured image;
generate a set of processed values by processing the set of values in the frequency domain based on the frequency characteristic of the filter; and
transform the set of processed values in the frequency domain to a filtered pixel corresponding to a pixel in the respective predetermined portion of the captured image; and
an information processing apparatus including:
a communication sensor configured to receive, from the image capturing apparatus, an output image on which the filtering process has been performed, and a display configured to display the output image,
wherein the processing circuitry of the image capturing apparatus is configured so that the frequency characteristic of the filter is a product of a frequency characteristic of a first filter for compensating the entire captured image for the aberration, and a frequency characteristic of a second filter for correcting the frequency characteristic of the first filter within the respective predetermined portion of the captured image.

13. An image capturing method comprising:
capturing an image with aberration caused by an optical system; and
performing a filtering process on the captured image based on a filter applicable to each predetermined portion of the captured image for compensating the aberration caused by the optical system, the filtering process including:
transforming the captured image to a set of values in a frequency domain;
calculating a frequency characteristic of the filter in each predetermined portion using a value $E[|S'(\omega)|^2]$ of a local power spectrum of an ideal image corresponding to a frequency characteristic $S'(\omega)$ of a local part of the ideal image, the frequency characteristics $S'(\omega)$ being obtained by transforming pixels in the local part of the ideal image into the frequency domain, the local part corresponding to the respective predetermined portion and being smaller than the entire captured image;
generating a set of processed values by processing the set of values in the frequency domain based on the frequency characteristic of the filter; and
transforming the set of processed values in the frequency domain to a filtered pixel corresponding to a pixel in the respective predetermined portion of the captured image,
wherein the frequency characteristic of the filter is a product of a frequency characteristic of a first filter for compensating the entire captured image for the aberration, and a frequency characteristic of a second filter for correcting the frequency characteristic of the first filter within the respective predetermined portion of the captured image.

14. The image capturing method according to claim 13, wherein a frequency characteristic R' of the filter is calculated by a following equation:

$$R'(\omega) \frac{H(\omega)^* \cdot E[|S'(\omega)|^2]}{|H(\omega)|^2 \cdot E[|S'(\omega)|^2] + E[|W(\omega)|^2]}$$

(R': the frequency characteristic of the filter,
S': the frequency characteristic of the local part of the ideal image,
W: a frequency characteristic of a noise,
H: a frequency characteristic of a point spread function of the optical system, and
ω: spatial frequency).

15. The image capturing method according to claim 13, wherein the frequency characteristic K of the second filter is calculated by a following equation:

$$K(\omega) == \frac{\frac{|H(\omega)|^2}{E[|W(\omega)|^2]} + E\left[\frac{1}{|S(\omega)|^2}\right]}{\frac{|W(\omega)|^2}{E[|W(\omega)|^2]} + E\left[\frac{1}{|S'(\omega)|^2}\right]}$$

(K: the frequency characteristic of the second filter,
S: a frequency characteristic of an entire ideal image,
S': the frequency characteristic of the local part of the ideal image, W: a frequency characteristic of a noise,
H: a frequency characteristic of a point spread function of the optical system, and
ω: spatial frequency).

16. The image capturing method according to claim 13, wherein the frequency characteristic K of the second filter is calculated by a following equation:

$$K(\omega) = \frac{E[|S'(\omega)|^2]}{E[|S(\omega)|^2]}$$

(K: the frequency characteristic of the second filter,
S: a frequency characteristic of an entire ideal image,
S': the frequency characteristic of the local part of the ideal image, and
ω: spatial frequency).

17. The image capturing method according to claim 13, wherein the frequency characteristic K of the second filter is calculated by a following equation:

$$K(\omega) = t \cdot E[|S'(\omega)|^2]$$

(K: the frequency characteristic of the second filter,
t: a constant of proportionality,
S': the frequency characteristic of the local part of the ideal image, and
ω: spatial frequency).

18. The image capturing method according to claim 13, wherein a number of taps of the second filter is smaller than a number of taps of the first filter.

19. The image capturing apparatus according to claim 1, wherein the processing circuitry is configured so that the second filter is calculated using the value $E[|S'(\omega)|^2]$ of the local power spectrum that corresponds to the respective predetermined portion of the captured image.

* * * * *